(12) United States Patent
Tripathi et al.

(10) Patent No.: US 12,108,354 B2
(45) Date of Patent: Oct. 1, 2024

(54) MANAGEMENT OF EPHEMERIS, TIME, DELAYS, AND TA FOR AN NTN

(71) Applicant: Samsung Electronics Co., Ltd., Suwon-si (KR)

(72) Inventors: Nishithkumar D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/069,197

(22) Filed: Dec. 20, 2022

(65) Prior Publication Data

US 2023/0117959 A1 Apr. 20, 2023

Related U.S. Application Data

(63) Continuation of application No. 17/445,566, filed on Aug. 20, 2021, now abandoned.

(60) Provisional application No. 63/190,352, filed on May 19, 2021, provisional application No. 63/190,088, filed on May 18, 2021, provisional application No. 63/150,321, filed on Feb. 17, 2021, provisional application No. 63/142,324, filed on Jan. 27, 2021, provisional application No. 63/141,116, filed on Jan. 25, 2021, provisional application No. 63/129,267, (Continued)

(51) Int. Cl.
*H04W 56/00* (2009.01)
(52) U.S. Cl.
CPC ..... *H04W 56/0045* (2013.01); *H04W 56/006* (2013.01)

(58) Field of Classification Search
CPC .......... H04W 56/0045; H04W 56/006; H04W 56/00; H04W 48/08; H04W 84/06; H04B 7/1851
See application file for complete search history.

(56) References Cited

U.S. PATENT DOCUMENTS

| 2012/0282969 A1* | 11/2012 | Jiang ................. H04W 56/0045 455/517 |
| 2019/0200320 A1* | 6/2019 | Selvaganapathy .... H04W 64/00 |
| 2019/0342845 A1* | 11/2019 | Laselva .............. H04B 7/18504 |
| 2019/0363843 A1* | 11/2019 | Gordaychik ............. H04L 1/08 |
| 2020/0404713 A1* | 12/2020 | Sakhnini ................ H04W 24/08 |
| 2021/0029658 A1* | 1/2021 | Mahalingam ...... H04B 7/18513 |

(Continued)

FOREIGN PATENT DOCUMENTS

| EP | 3799470 A1 * | 3/2021 | ......... H04B 7/18504 |
| EP | 3907902 A1 * | 11/2021 | ......... H04B 7/18504 |

(Continued)

OTHER PUBLICATIONS

"3rd Generation Partnership Project; Technical Specification Group Radio Access Network; Study on New Radio (NR) to support non-terrestrial networks (Release 15)", 3GPP TR 38.811 V15.2.0, Sep. 2019, 126 pages.

(Continued)

*Primary Examiner* — Nathan S Taylor

(57) ABSTRACT

A method for operating a user equipment (UE) comprises receiving system information including: information corresponding to location coordinates for a non-terrestrial network (NTN) gateway; information corresponding to a processing delay between the UE and a base station (BS); and information corresponding to a reference point location; determining a timing advance based on a timing difference between the reference point location and the BS; and transmitting a timing advance report based on the determined timing advance.

14 Claims, 20 Drawing Sheets

Related U.S. Application Data filed on Dec. 22, 2020, provisional application No. 63/123,171, filed on Dec. 9, 2020, provisional application No. 63/083,618, filed on Sep. 25, 2020, provisional application No. 63/072,614, filed on Aug. 31, 2020.

(56) References Cited

U.S. PATENT DOCUMENTS

| | | | |
|---|---|---|---|
| 2021/0105761 A1* | 4/2021 | Cheng | H04B 7/18504 |
| 2021/0153193 A1* | 5/2021 | Lin | H04W 72/542 |
| 2021/0195546 A1* | 6/2021 | Lei | H04W 56/0045 |
| 2021/0251012 A1* | 8/2021 | Shrestha | H04W 56/0045 |
| 2021/0273717 A1* | 9/2021 | Wigard | H04W 76/27 |
| 2021/0391909 A1* | 12/2021 | Lee | H04B 7/063 |
| 2022/0006514 A1* | 1/2022 | Sedin | H04L 1/1883 |
| 2022/0070907 A1* | 3/2022 | Hofström | H04W 28/0278 |
| 2022/0117003 A1* | 4/2022 | Shin | H04W 72/1263 |
| 2022/0131729 A1* | 4/2022 | You | H04L 27/2602 |
| 2022/0131733 A1* | 4/2022 | You | H04W 88/04 |
| 2022/0141074 A1* | 5/2022 | You | H04L 5/0048 375/262 |
| 2022/0191936 A1* | 6/2022 | Shin | H04W 74/0833 |
| 2022/0386263 A1* | 12/2022 | Miao | H04B 7/1851 |
| 2022/0408384 A1* | 12/2022 | Määttanen | H04W 56/005 |
| 2023/0007608 A1* | 1/2023 | Li | H04W 74/0808 |

FOREIGN PATENT DOCUMENTS

| | | |
|---|---|---|
| WO | 2019195457 A1 | 10/2019 |
| WO | 2020031120 A2 | 2/2020 |
| WO | WO-2022027012 A1 * | 2/2022 |

OTHER PUBLICATIONS

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Multiplexing and channel coding (3GPP TS 38.212 version 15.8.0 Release 15)", ETSI TS 138 212 V15.8.0, Jan. 2020, 106 pages.

"5G; NR; Physical channels and modulation (3GPP TS 38.211 version 15.8.0 Release 15)", ETSI TS 138 211 V15.8.0, Jan. 2020, 100 pages.

"5G; NR; Medium Access Control (MAC) protocol specification (3GPP TS 38.321 version 16.2.1 Release 16)", ETSI TS 138 321 V16.2.1, Nov. 2020, 156 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

International Search Report of the International Searching Authority in connection with International Application No. PCT/KR2021/011693 issued Dec. 1, 2021, 4 pages.

Mediatek et al., "UL Time and Frequency Synchronisation for NR-NTN" 3GPP TSG RAN WG1 Meeting #102e. R1-2005496, Aug. 24-28, 2020, 14 pages.

Mediatek Inc., "Timing relationship enhancements for NR-NTN" 3GPP TSG RAN WG1 Meeting #102e, R1-2005495, Aug. 24-28, 2020, 6 pages.

Catt et al., "Measurement Initiation Issue for NTN System" 3GPP TSG-RAN WG2 Meeting #108, R2-1916521 revise of R2-1916508, Reno, USA, Nov. 18-22, 2019, 6 pages.

Extended European Search Report issued Feb. 6, 2024 regarding Application No. 21862163.9, 8 pages.

Huawei et al., "Discussion on Doppler compensation, timing advance and RACH for NTN", 3GPP TSG RAN WG1 Meeting #99, R1-1911860, Nov. 2019, 14 pages.

Huawei et al., "Discussion on timing relationship enhancements for NTN", 3GPP TSG RAN WG1 Meeting #102-e, R1-2005265, Aug. 2020, 6 pages.

Moderator (Thales), "Feature lead Summary on enhancements on UL time and frequency synchronization", 3GPP TSG-RAN WG1 Meeting #102-e, R1-2007290, Aug. 2020, 60 pages.

* cited by examiner

MANAGEMENT OF EPHEMERIS, TIME, DELAYS, AND TA FOR AN NTN

CROSS-REFERENCE TO RELATED APPLICATIONS AND CLAIM OF PRIORITY

This application is a continuation of U.S. patent application Ser. No. 17/445,566, filed on Aug. 2, 2021, which claims priority to U.S. Provisional Patent Application No. 63/072,614, filed on Aug. 31, 2020; U.S. Provisional Patent Application No. 63/083,618, filed on Sep. 25, 2020; U.S. Provisional Patent Application No. 63/123,171, filed on Dec. 9, 2020; U.S. Provisional Patent Application No. 63/129,267, filed on Dec. 22, 2020; U.S. Provisional Patent Application No. 63/141,116, filed on Jan. 25, 2021; U.S. Provisional Patent Application No. 63/142,324, filed on Jan. 27, 2021; U.S. Provisional Patent Application No. 63/150,321, filed on Feb. 17, 2021; U.S. Provisional Patent Application No. 63/190,088, filed on May 18, 2021; and U.S. Provisional Patent Application No. 63/190,352, filed on May 19, 2021. The contents of the above-identified patent documents are incorporated herein by reference.

TECHNICAL FIELD

The present disclosure relates generally to wireless communication systems and, more specifically, the present disclosure relates to management of ephemeris, time, delays, and TA for an NTN.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to management of ephemeris, time, delays, and TA for an NTN. Furthermore, while some elements of the disclosure are useful for both a terrestrial network (TN) and a non-terrestrial network (NTN), certain elements significantly enhance the performance of an NTN.

In one embodiment, a user equipment (UE) is provided. The UE includes a transceiver configured to receive system information including: information corresponding to location coordinates for a non-terrestrial network (NTN) gateway; information corresponding to a processing delay between the UE and a base station (BS); and information corresponding to a reference point location. The UE also includes a processor operably connected to the transceiver. The processor is configured to determine a timing advance based on a timing difference between the reference point location and the BS. The transceiver is further configured to transmit a timing advance report based on the determined timing advance.

In another embodiment, a BS is provided. The BS includes a processor configured to: generate system information including: information corresponding to location coordinates for a non-terrestrial network (NTN) gateway; information corresponding to a processing delay between a user equipment (UE) and a base station; and information corresponding to a reference point location. The BS also includes a transceiver operably connected to the transceiver. The transceiver is configured to: transmit the system information; and receive a timing advance report based on a timing advance, wherein the timing advance is based on a timing difference between the reference point location and the base station.

In yet another embodiment, a method for operating a UE is provided. The method includes receiving system information including: information corresponding to location coordinates for a non-terrestrial network (NTN) gateway; information corresponding to a processing delay between the UE and a base station (BS); and information corresponding to a reference point location; determining a timing advance based on a timing difference between the reference point location and the BS; and transmitting a timing advance report based on the determined timing advance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP, TR 38.811 v15.2.0, "Study on NR to support non-terrestrial networks"; 3GPP, TR 38.821 v16.0.0, "Solutions for NR to support non-terrestrial networks (NTN)"; 3GPP, TS 38.212 v15.8.0, "5G; NR; Multiplexing and channel coding"; 3GPP, TS 38.211 v15.8.0, "5G; NR; Physical channels and modulation"; 3GPP TS 38.321 v16.2.0, "NR; Medium Access Control (MAC) protocol specification"; and 3GPP TS 38.331 v16.2.0, "NR; Radio Resource Control (RRC) Protocol Specification."

Figure 1:
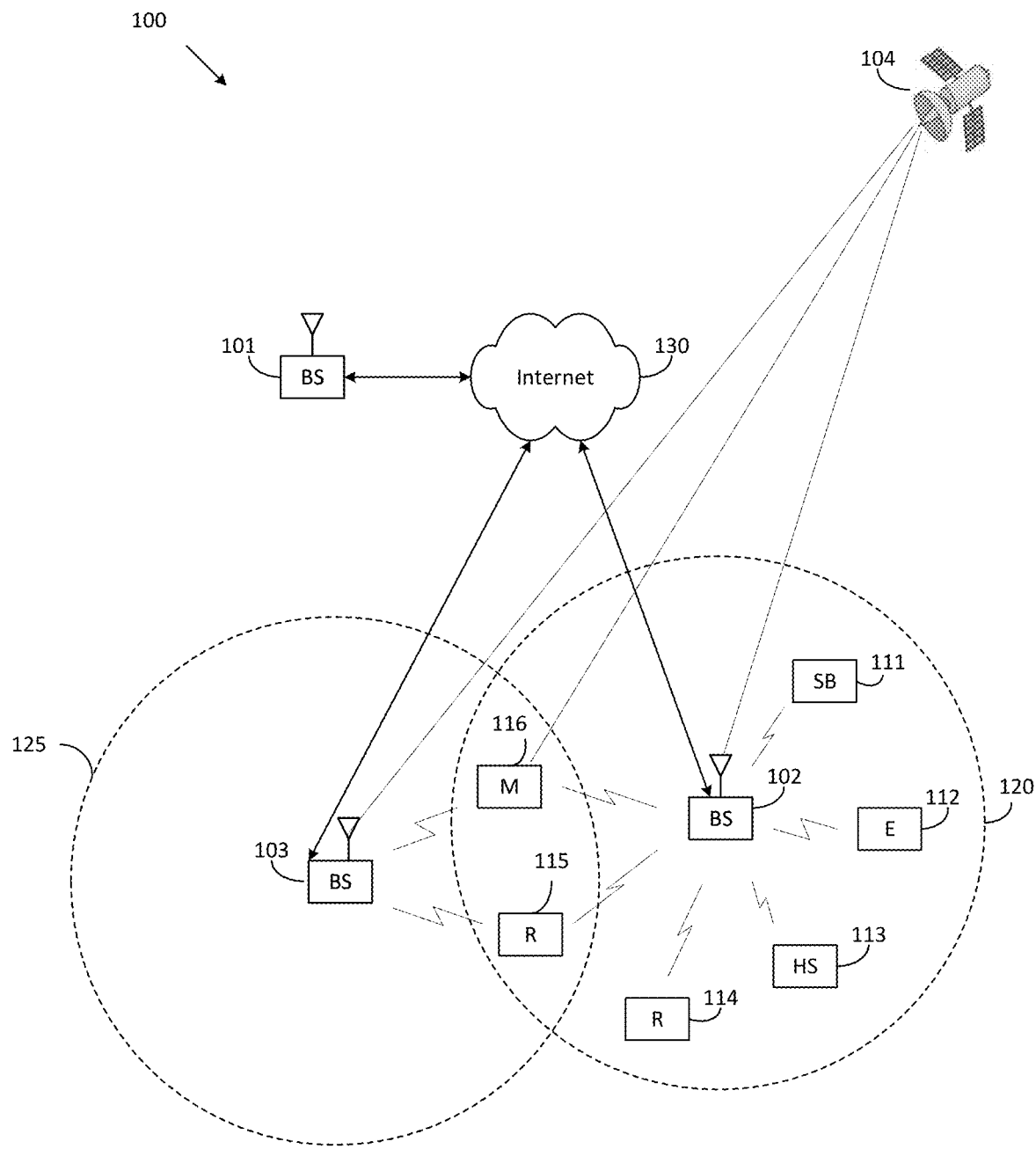
FIG. 1 illustrates an example wireless network according to embodiments of the present disclosure.
Figure 2:
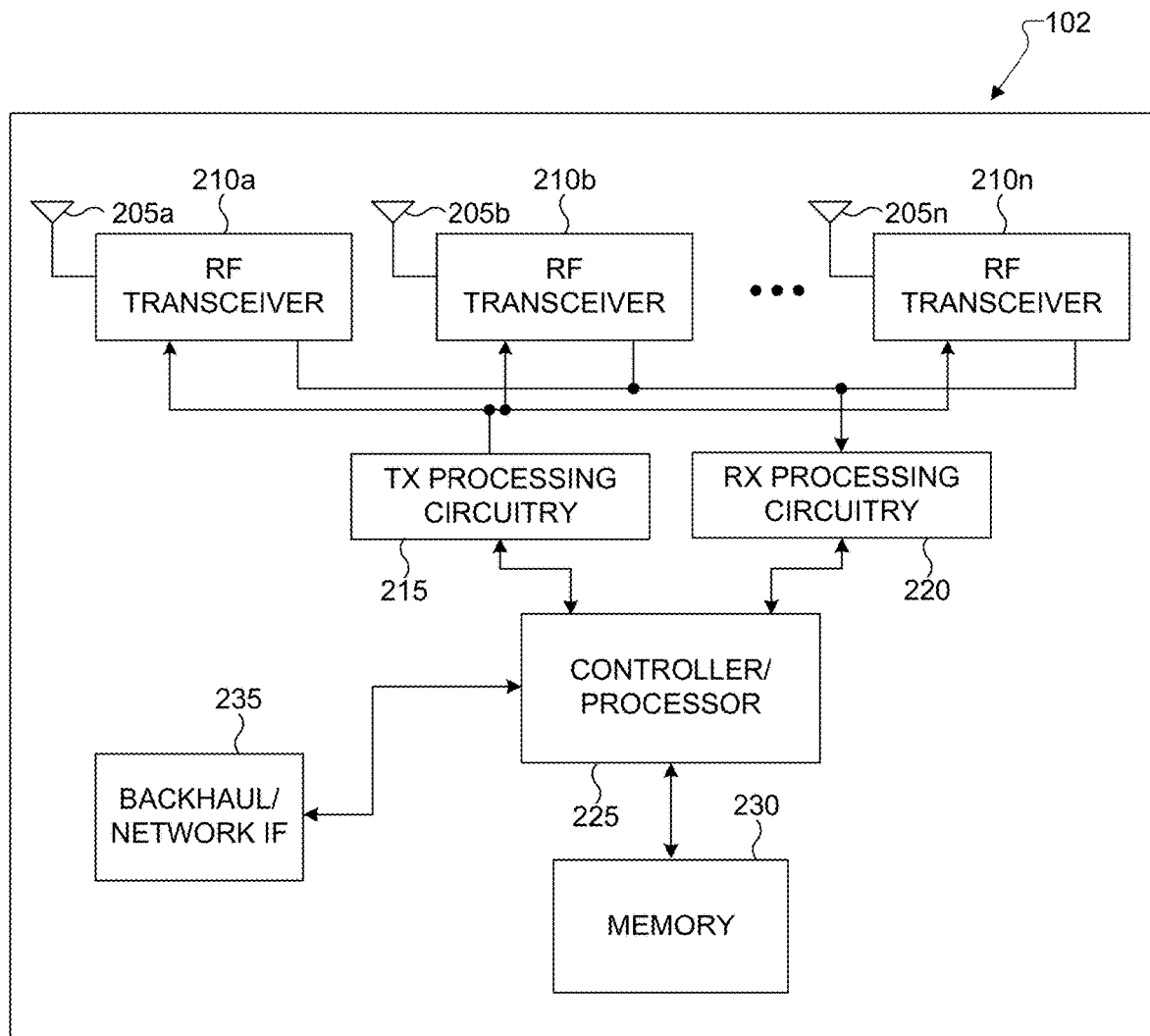
FIG. 2 illustrates an example gNB according to embodiments of the present disclosure.
Figure 3:
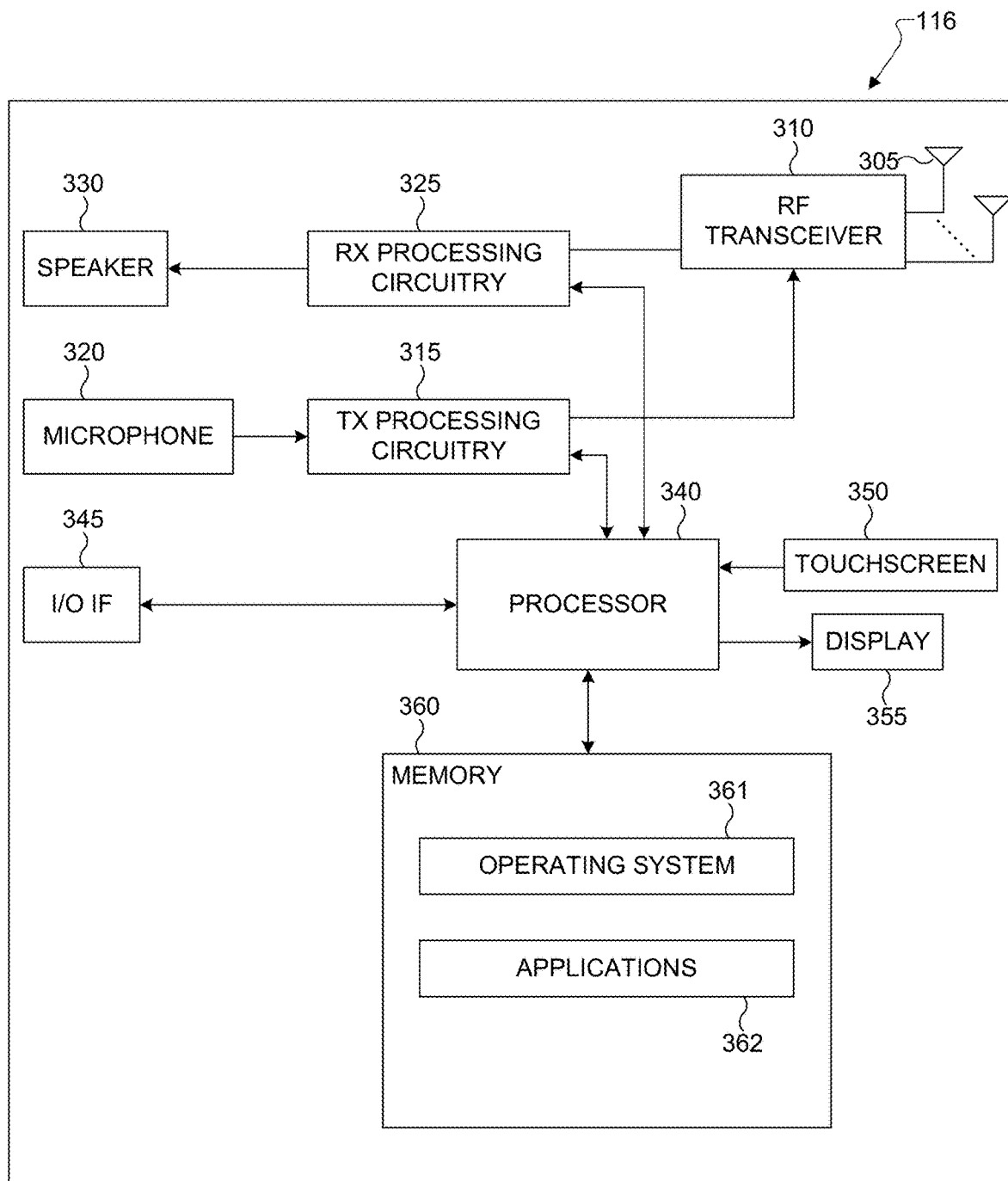
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for receiving system information including: information corresponding to location coordinates for a non-terrestrial network (NTN) gateway; information corresponding to a processing delay between the UE and a base station (BS); and information corresponding to a reference point location; determining a timing advance based on a timing difference between the reference point location and the BS; and transmitting a timing advance report based on the determined timing advance. One or more of the gNBs 101-103 includes circuitry, programing, or a combination thereof, for generating system information including: information corresponding to location coordinates for a non-terrestrial network (NTN) gateway; information corresponding to a processing delay between a user equipment (UE) and a base station; and information corresponding to a reference point location; transmitting the system information; and receiving a timing advance report based on a timing advance, wherein the timing advance is based on a timing difference between the reference point location and the base station.

As discussed in greater detail below, the wireless network 100 may have communications facilitated via one or more communication satellite(s) 104 that may be in obit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving system information including: information corresponding to location coordinates for a non-terrestrial network (NTN) gateway; information corresponding to a processing delay between the UE and a base station (BS); and information corresponding to a reference point location; determining a timing advance based on a timing difference between the reference point location and the BS; and transmitting a timing advance report based on the determined timing advance. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
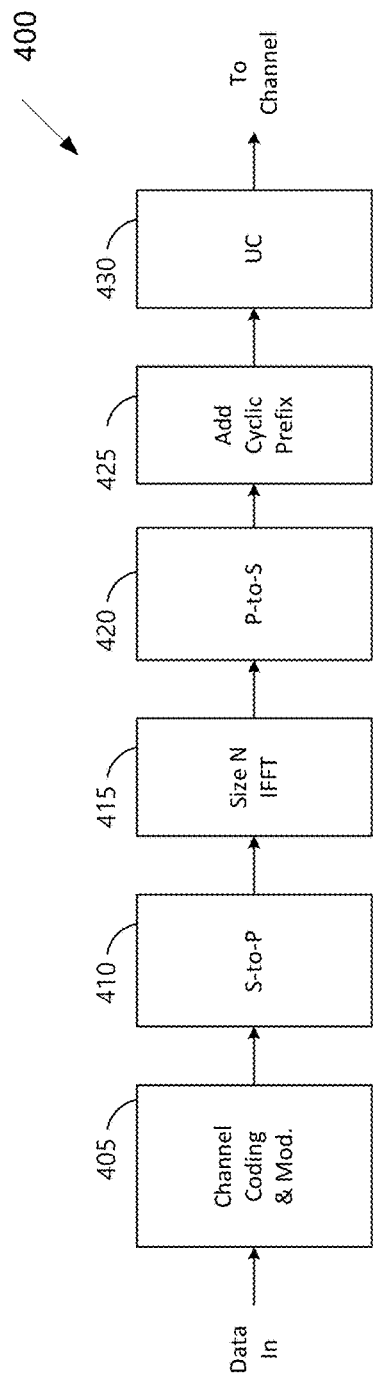
FIGS. 4 and 5 illustrate example wireless transmit and receive paths according to embodiments of the present disclosure.
Figure 5:
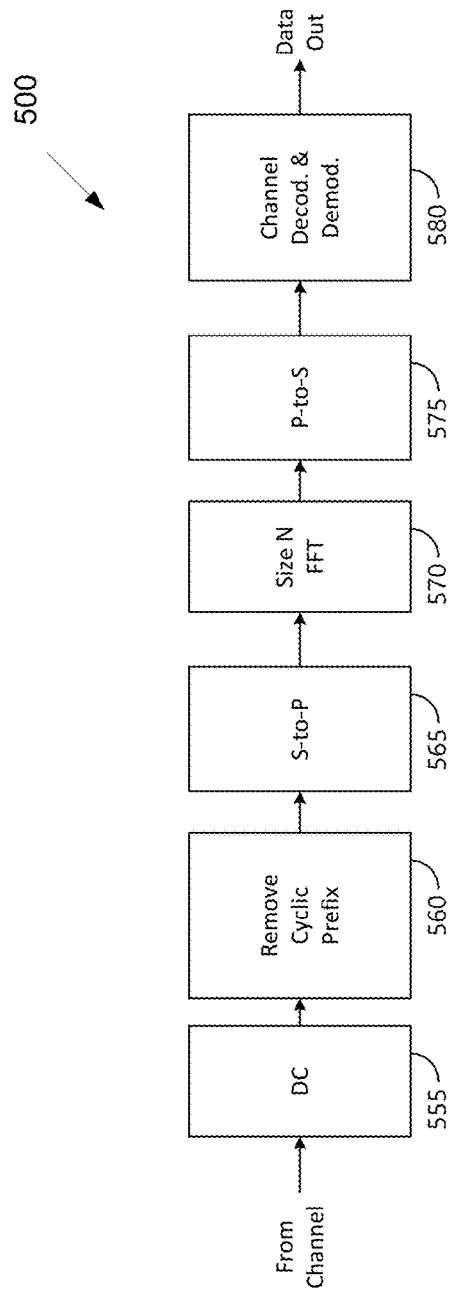

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A non-terrestrial network (NTN) refers to a network, or segment of networks using RF resources on board a communication satellite (or unmanned aircraft system platform) (e.g., communication satellite(s) 104). Considering the capabilities of providing wide coverage and reliable service, an NTN is envisioned to ensure service availability and continuity ubiquitously. For instance, an NTN can support communication services in unserved areas that cannot be covered by conventional terrestrial networks, in underserved areas that are experiencing limited communication services, for devices and passengers on board moving platforms, and for future railway/maritime/aeronautical communications, etc.

In an NTN, the cells may be moving, leading to inaccuracy of the UE's perception of the platform's position and various types of propagation and processing delays in the system. The knowledge of various delays and prediction of the platform ephemeris data can be used for a more accurate estimation of timing adjustment (TA), leading to better pre-compensation at the UE.

Figure 6:
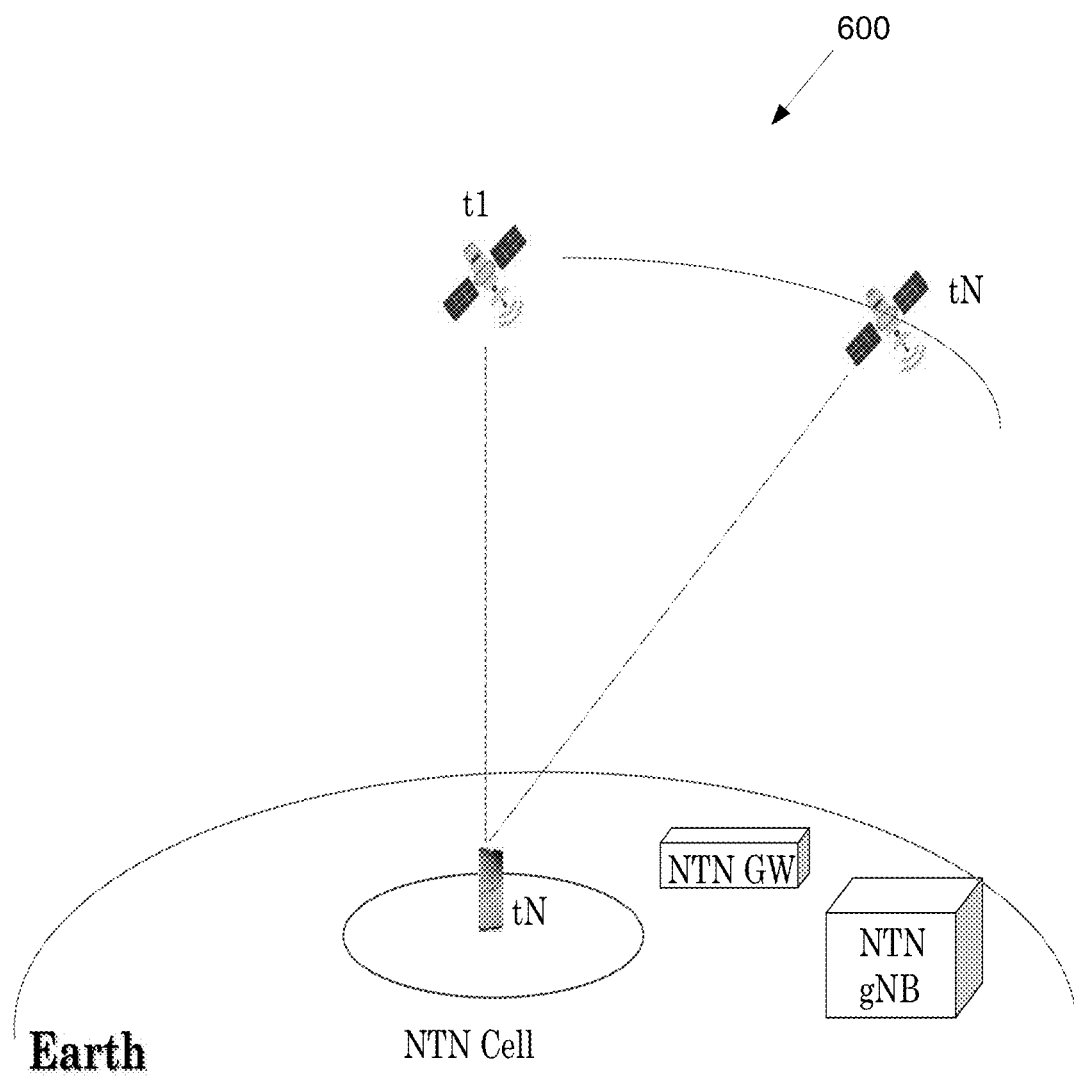
FIG. 6 illustrates an example of distance estimation according to embodiments of the present disclosure.

FIG. 6 illustrates an example of distance estimation 600 according to an embodiment of the present disclosure. The embodiment of the example of distance estimation 600 illustrated in FIG. 6 is for illustration only. FIG. 6 does not limit the scope of this disclosure to any particular implementation of the example of distance estimation 600.

As illustrated in FIG. 6, the UE is attempting to estimate its distance from the aerial/space-borne platform (e.g., a satellite). Such distance estimate can then be used to do any timing pre-compensation at the UE. This knowledge can also be used to determine, report and use a suitable Timing Advance.

The aerial/space-borne platform acquires its own GNSS-based position at time t1. This information reaches a gNB via an NTN Gateway. The gNB places the satellite's (potentially transformed position) in suitable System Information (SI). The UE receives the satellites position at time tN and can now compare the satellite's position with its own position at time tN. While FIG. 6 shows the aerial/space-borne platform moving from left to right, such platform may also be stationary with respect to a point on the Earth's surface.

Figure 7:
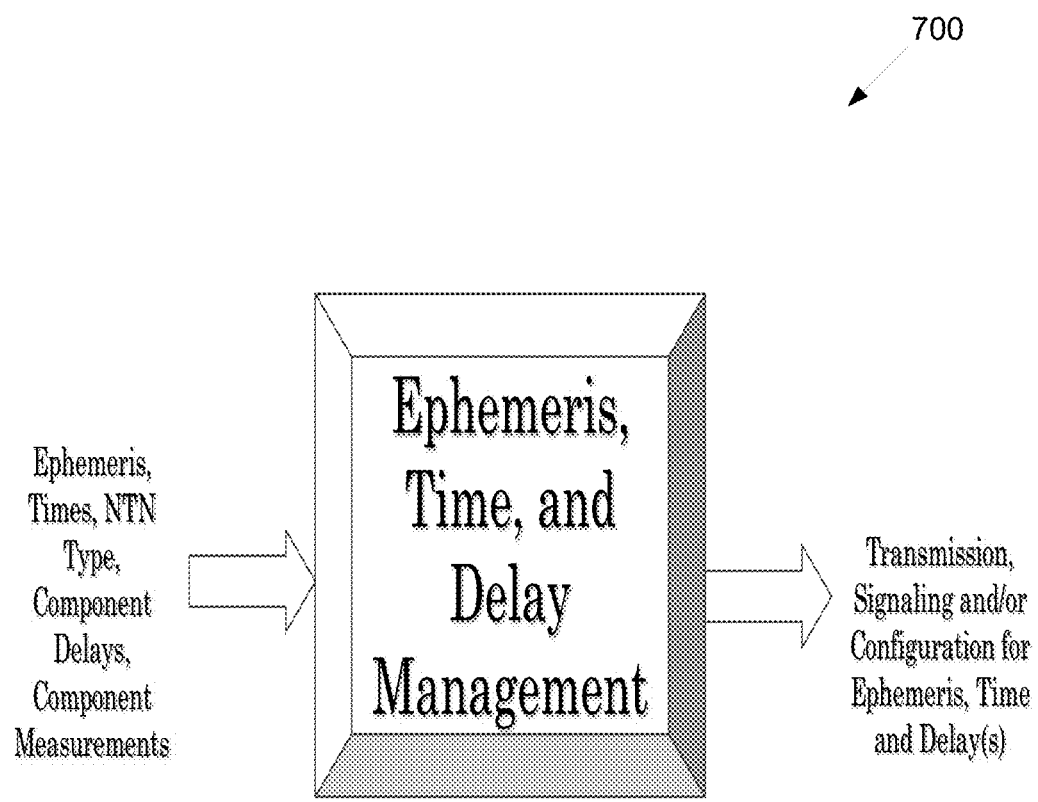
FIG. 7 illustrates an example of a mechanism of management of ephemeris, time, and delay(s) according to embodiments of the present disclosure.

FIG. 7 illustrates an example of a mechanism of management of ephemeris, time, and delay(s) 700 according to embodiments of the present disclosure. The embodiment of the example of a mechanism of management of ephemeris, time, and delay(s) 700 illustrated in FIG. 7 is for illustration only. FIG. 7 does not limit the scope of this disclosure to any particular implementation of the example of a mechanism of management of ephemeris, time, and delay(s) 700.

As illustrated in FIG. 7, a gNB receives information, such as information regarding ephemeris, times, NTN type, component delays, and component measurements, and transmits information regarding transmission, signaling, and/or configuration for ephemeris, time, and delay(s).

Figure 8:
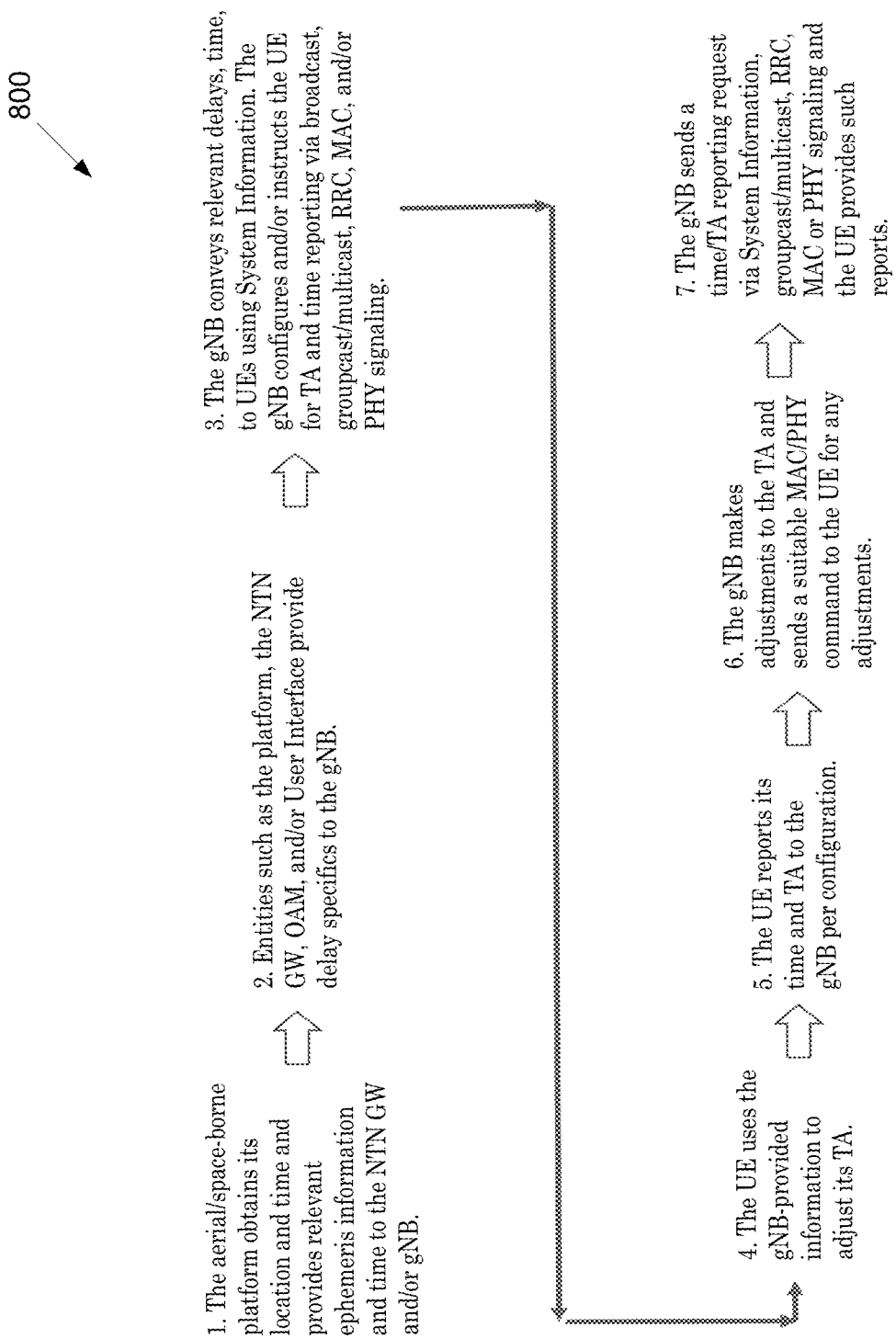
FIG. 8 illustrates an example of operations for ephemeris, time, and delay management according to embodiments of the present disclosure.

FIG. 8 illustrates an example of operations for ephemeris, time, and delay management 800 according to an embodiment of the present disclosure. The embodiment of the example operations for ephemeris, time, and delay management 800 700 illustrated in FIG. 8 is for illustration only. FIG. 8 does not limit the scope of this disclosure to any particular implementation of the example operations for ephemeris, time, and delay management 800.

As illustrated in FIG. 8, the aerial/space-borne platform obtains its location and time and provides relevant ephemeris information and time to the NTN GW and/or gNB. Entities such as the platform, the NTN GW, OAM, and/or user-interface provide delay specifics to the gNB. The gNB conveys relevant delays, time, etc. to UEs using system information. The gNB configures and/or instructs the UE for TA and time reporting via broadcast, groupcast/multicast, RRC, MAC, and/or PHY signaling. The UE uses the gNB-provided information to adjust its TA. The UE reports its time and TA to the gNB per configuration. The gNB makes adjustments to the TA and sends a suitable MAC/PHY command to the UE for any adjustments. The gNB sends a time/TA reporting request via system information, groupcast/multicast, RRC, MAC, or PHY signaling and the UE provides such reports.

Table T1 specifies examples of various instants and delays relevant to one or more embodiments of the disclosure.

TABLE T1

Examples of Time and Delay Perspectives in an NTN

| Time | Description |
|---|---|
| T1 | The platform obtains its GNSS-based position. |
| T2 | The NTN GW receives the platform's position. T2 = T1 + Tpl_pl_to_fl_tx + Tfl_pl_to_fl_pd, where Tpl_pl_to_fl_tx is the processing time needed by the platform to start sending the position, velocity, and time (PVT) information to the NTN GW and Tfl_pl_to_gw_pd is the propagation delay on the feeder link delay from the platform to the NTN GW. |
| T3 | The gNB receives the PVT information from the NTN GW. T3 = T2 + Tgw_gw_to_gnb_send + Tgw-gnb_gw_to_gnb_td, where Tgw_gw_to_gnb_send is the processing time needed by the NTN GW to start sending the platform's PVT information to the gNB and Tgw-gnb_gw_to_gnb_td is the transport delay from the NTN GW to the gNB. |
| T4 | The gNB starts transmitting a SIB containing the PVT information to the NTN GW. T4 = T3 + Tgnb_scheduling, where Tgnb_scheduling is the scheduling delay at the gNB. |
| T5 | The NTN GW receives the SIB containing the PVT information from the gNB. T5 = T4 + Tgw-gnb_gnb_to_gw_td, where Tgw-gnb_gnb_to_gtw_td is the transport delay from the gNB to the NTN GW. |
| T6 | The NTN-GW starts transmitting the SIB containing the PVT information to the platform. T6 = T5 + Tgw_gw_to_pl_tx, where Tgw_gw_to_pl_tx is the processing time needed by the NTN GW to start transmitting the SIB containing the PVT information to the platform. |
| T7 | The platform receives the SIB containing the PVT information. T7 = T6 + Tfl_gw_to_pl_pd, where Tfl_gw_to_pl_pd is the propagation delay on the feeder link delay from the NTN GW to the platform. |
| T8 | The platform starts transmitting the SIB containing the PVT information to UEs. T7 = T6 + Tpl_pl_to_UE_tx, where Tpl_pl_to_UE_tx is the processing time needed by the platform to start transmitting the SIB containing the PVT information to UEs in the NTN cell. |
| T9 | The UE receives the SIB containing the PVT information from the platform. T9 = T8 + Tsl_pl_to_UE_pd, where Tsl_pl_to_UE_pd is the propagation delay on the service link (or the access link) from the platform to the UE. |
| T10 | The UE transmits a signal to the platform. |
| T11 | The platform receives the UE's signal. T11 = T10 + Tsl_UE_to_pl_pd, where Tsl_UE_to_pl_pd is the propagation delay on the service link (or the access link) from the UE to the platform. |
| T12 | The NTN GW receives the UE's signal. T12 = T11 + Tpl_pl_to_fl_tx + Tfl_pl_to_fl_pd, where Tpl_pl_to_fl_tx is the processing time needed by the platform to start sending the UE signal to the NTN GW and Tfl_pl_to_gw_pd is the propagation delay on the feeder link delay from the platform to the NTN GW. |
| T13 | The gNB receives the UE's signal from the NTN GW. T13 = T12 + Tgw_gw_to_gnb_send + Tgw-gnb_gw_to_gnb_td, where Tgw_gw_to_gnb_send is the processing time needed by the NTN GW to start sending the UE's signal to the gNB and Tgw-gnb_gw_to_gnb_td is the transport delay from the NTN GW to the gNB. |

Figure 9:
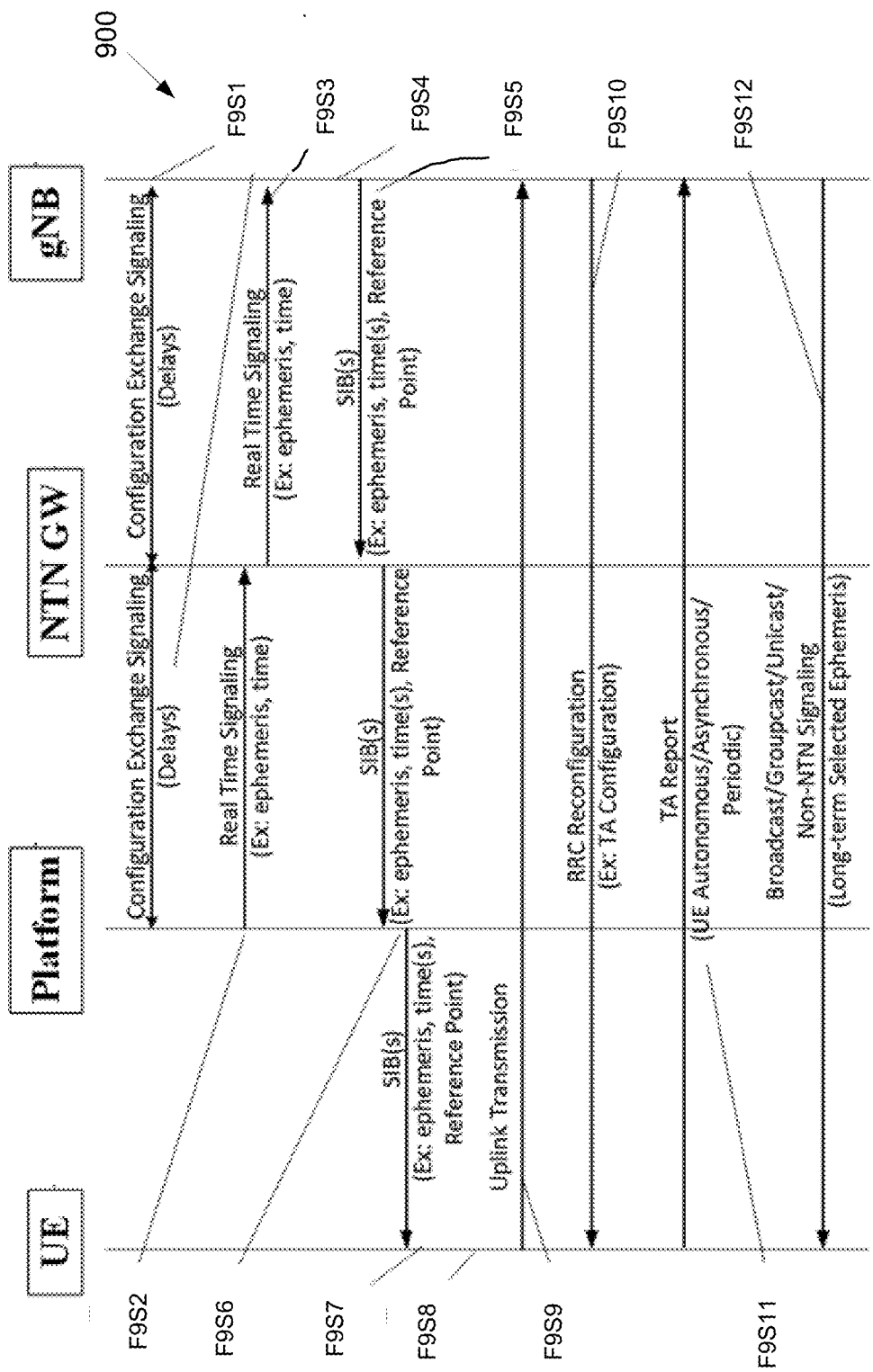
FIG. 9 illustrates an example of overall UE-network procedures for management of ephemeris, time, and delay(s) according to embodiments of the present disclosure.

FIG. 9 illustrates an example of overall UE-network procedures for management of ephemeris, time, and delay(s) 900 according to an embodiment of the present disclosure. The embodiment of the example overall UE-network procedures for management of ephemeris, time, and delay(s) 900 illustrated in FIG. 9 is for illustration only. FIG. 9 does not limit the scope of this disclosure to any particular implementation of the example overall UE-network procedures for management of ephemeris, time, and delay(s) 900.

In operation F9S1, in an example approach, the airborne or space-borne platform such as a satellite/HAPS (referred to as "Platform" or Block 811), the NTN Gateway, and the gNB exchange one or more of the delays shown in the example table T1.

In operation F9S2, in an example approach, the platform uses real-time signaling to convey selected ephemeris data (e.g., position (x,y,z) and velocity (vx, vy, vz)) and time to the NTN Gateway. In another approach, the orbital parameters including time ("the epoch") are sent by the platform. In yet another implementation, the Reference Point coordinates (e.g., corresponding to the center of the cell) are also specified by the platform. In an alternative approach, the NTN GW, an OAM system, an application server, or an entity inside or connected to the gNB may provide the Reference Point coordinates to the gNB based on the selected ephemeris data and known satellite beam parameters (e.g., beam coverage) and time. In another approach, to specify the platform's position, the orbital parameters including time ("the epoch") are used.

In operation F9S3, in an example approach, the NTN-GW uses the history of selected ephemeris data and the knowledge of propagation and processing delays to predict and then specify the selected ephemeris data at the instant a UE at a Reference Point in the cell would receive such information from the gNB via the NTN GW and the platform. In another alternative, the NTN-GW the NTN-GW does not perform such prediction but forwards the received original selected ephemeris data and time received from the platform to the gNB.

In operation F9S4, in an example approach, the gNB uses the history of selected ephemeris data and the knowledge of propagation and processing delays to predict and then specify the selected ephemeris data at the instant a UE at a Reference Point in the cell would receive such information from the gNB via the NTN GW and the platform. In another alternative, the gNB does not perform such prediction but makes use of the original or NTN GW-modified selected ephemeris data and time.

In operation F9S5, in an example approach, the gNB specifies one or more instants, selected ephemeris data associated with one more instants, and Reference Point location coordinates associated with one more instants to the NTN GW for eventual transmission to the UE. In another embodiment of the disclosure, the gNB also specifies the location coordinates for one or more NTN-GWs (often referred to as "coordinates" for simplicity in this disclosure). For example, in general one NTN-GW may be adequate for a give NTN cell until the feeder link switch is needed. The time applicability of the NTN-GW for a given UE or a set of UEs is also determined by the gNB and potentially conveyed to UEs by the gNB in an example implementation. In an embodiment of the disclosure, the gNB constructs one or more SIBs to convey one or more instants, selected ephemeris data associated with one more instants, Reference Point location coordinates associated with one more instants to the NTN GW, and/or NTN-GW location coordinates such that different information can be sent with different configurable periodicity. For example, more long-term or event-based information such as NTN-GW location coordinates are sent less frequently, while more real-time information such as short-term ephemeris data is sent more frequently. Furthermore, in an example approach, certain system information such as NTN-GW coordinates is sent using groupcast/multicast signaling, where a subset of UEs in the cell (and not all UEs in the cell) receive selected NTN-GW information.

In operation F9S5, in an embodiment of the disclosure, the gNB specifies to the UE via broadcast, groupcast/multicast signaling, and/or UE-specific RRC signaling which parameters to use directly and which parameters to estimate to facilitate pre-compensation, TA calculation and TA reporting.

Examples of times that the gNB may specify include the current time as observed by the gNB, the platform-provided time (i.e., the instant when the platform position was determined/obtained from a GNSS), and/or the NTN-GW provided time, and the expected time of reception of the SIB(s) at the Reference Point. In an embodiment of the disclosure, the times may be full-fledged times (e.g., hours, minutes, seconds, and so on). In another embodiment of the disclosure, the times may be represented in a compact manner (e.g., by avoiding larger time scales such as hours and minutes).

In an embodiment of the disclosure, in operation F9S1, the NTN-GW and the gNB as part of configuration signaling exchange or via configuration by an OAM system, a server, or a User Interface, are configured with the instructions on which entity (i.e., the platform, the gNB, the NTN-GW, or a new entity) will do such prediction of the platform ephemeris at a future instant along with the identification of such future instant such as one or more the following instants: (i) the instant when the gNB creates the SIB message, (ii) the instant when the NTN GW receives the SIB(s) from the gNB, (iii) the instant when the platform receives the SIB(s), (iv) the instant when the Reference Point of the cell receives the SIB(s), and (v) the instant when the UE receives the SIB(s).

In operation F9S6, in an example approach, the NTN-GW sends one or more times, selected ephemeris data associated with one or more times, Reference Point coordinates associated with one or more times, and selected delays to the platform and the platform sends such information to the UE on the access/service link.

In operation F9S7, the UE obtains the received time(s), ephemeris data, Reference Point coordinates, and the delay(s).

In operation F9S8, the UE determines suitable Timing Advance as part of the pre-compensation for the timing (and frequency) adjustments. In an example embodiment of the disclosure, depending upon the specific method of pre-compensation, the UE estimates the required timing adjustment for its uplink transmissions using the timing difference between (i) the Reference Point location and the gNB and (ii) the UE location and the gNB. When the periodicity of the information updates related to time(s), ephemeris data, Reference Point coordinates, and the delay(s) is fast enough to meet the accuracy requirements, the UE assumes symmetric gNB-to-UE and UE-to-gNB delays in an example approach. In another approach, the UE assumes asymmetric gNB-to-UE and UE-to-gNB delays while calculating the Timing Advance. More specifically, the UE may utilize or predict the time(s) and ephemeris data at the instant when its transmission is expected to be received by gNB.

In an example implementation, the UE estimates the receive time instant at the gNB using the following formula.

$$t\_gNB = t\_ue + 2*t\_gNB\_to\_ue\_delay\_observed + t\_ue\_to\_platform\_adjustment + t\_platform\_to\_gNB\_adjustment \quad \text{Eq. (1)}$$

In Eq. (1), t_ue_to_platform_adjustment and t_platform_to_gNB_adjustment reflect the timing adjustments due to asymmetric of delays arising due to different positions of the platform (and potentially the UE) during the gNB-to-UE transmission and the UE-to-gNB transmission. In an example implementation, the total TA applied by the UE is calculated as the (2*t_gNB_to_ue_delay_observed+ t_ue_to_platform_adjustment+t_platform_to_gNB_adjustment) in Eq. (1).

In operation F9S9, the UE carries out uplink transmissions using pre-compensation (e.g., UE autonomous, network-assisted, or network-dictated). In an example implementation, the gNB uses broadcast or groupscast/multicast signaling to indicate the type of pre-compensation method supported or allowed in the cell. Furthermore, in an example implementation, parameters to be used by the UE and the applicable conditions for the use of such parameters are implicitly defined (e.g., via specifications in the standard) or are explicitly configured by the gNB.

In operation F9S10, in one example approach, the gNB configures the UE with TA reporting configuration via dedicated RRC signaling. In another example approach, the gNB may broadcast or groupcast/multicast parameters or indicators to configure the UE with relevant TA reporting. In one implementation, the gNB may configure a UE to report full TA (i.e., the TA covering gNB-to-UE delay and UE-to-gNB delay). In another implementation, the gNB may configure a UE to report incremental TA relative to a Reference Point. In another implementation, the TA may be specified relative to an NTN Type-based minimum common delay (e.g., the delay calculated according to the type of the platform such as GEO/LEO/HAPS and the minimum distance between the platform and the UE).

In operation F9S11, the UE sends a TA report to the gNB. In one approach, the UE may send the TA report autonomously when certain conditions are met (e.g., when the absolute or relative TA exceeds an amount or when random access is carried out in a handover or non-handover situation). In another approach, the UE sends the TA report periodically (e.g., every X ms). In yet another approach, the gNB may command the UE for a TA report, and, the UE responds with a TA.

In operation F9S11, the TA report is sent in an RRC message (e.g., Measurement Report and RRC Resume) or at a lower layer (e.g., UCI or a MAC Control Element) per configuration by the gNB.

For Long-term ephemeris data (i.e., the data that is valid for a time period longer than few minutes or few hours), the network conveys such data to the UE in operation F9S12 using a variety of mechanisms such as broadcast, groupcast/multicast, or unicast signaling in an NTN, pre-provisioning in the UE in a SIM, or non-NTN signaling (e.g., the use of a traditional cellular network or a Wi-Fi network). Changes in the long-term ephemeris data may be conveyed by the use of a valueFlag that is associated with a specific version of the long-term ephemeris data. The UE looks for new long-term ephemeris data only when valueFlag changes in a suitable SIB in an example approach. The updated data may be conveyed in an incremental fashion (i.e., changes in specific parameters only or full replacement of old data). The periodicities of the valueFlag, long-term ephemeris data, and changes in long-term ephemeris data are independently controlled in an example approach.

For the time(s) specified in the steps above, several approaches are possible. In one approach, the time is an absolute time (e.g., UTC or the GNSS-based time). In another approach, to reduce the overhead, only the more granular times are specified (e.g., minutes and seconds or seconds), while the less granular times are skipped (e.g., hours or hours and minutes). In yet another approach, absolute times are sent with some periodicity and incremental or granular times are sent more frequently. In another approach, when multiple times are specified in a single message, one time may be selected as a reference time and may be specified as an absolute time with all granularities (e.g., hours, minutes, seconds, and so on) or with selected granularities (e.g., seconds only) and other non-reference times may be incremental times relative to such reference time.

In an example implementation, in addition to the instants for the gNB-to-UE transmission, the instants for the UE-to-gNB transmissions may also be specified. For example, a suitable entity (e.g., gNB, platform, and NTN-GW, with gNB being a common choice) may specify the times and positions at the instant the UE's signal is expected at the platform, at the NTN-GW, and/or at the gNB. Such information enables the UE to accurately calculate UE-to-platform delay and platform-to-NTN-GW delay.

For the platform positions and velocities specified in the steps above, several approaches are possible. First of all, positions and velocities may be sent with the same or different periodicities. For example, the position may be sent at one periodicity, but the velocity may be sent at another periodicity. The numerical values of the position and the velocity may not change by the same extent from one instant to the next. Hence, if a quantity is not changing rapidly, such quantity can be sent less frequently. In contrast, if a quantity is changing rapidly, such quantity needs to be sent more frequently so that the UE's understanding of the platform's position and velocity is accurate. Furthermore, in one approach, absolute values are used. In yet another approach, absolute values are sent with some periodicity and changes in values are sent more frequently. In another approach, when multiple positions and multiple velocities are specified in a single message, one set of values is selected as a reference and other non-reference values are specified as incremental times relative to such reference time. Furthermore, if newer positions are specified but newer velocities are not specified, the previously-specified velocities are used.

Figure 10:
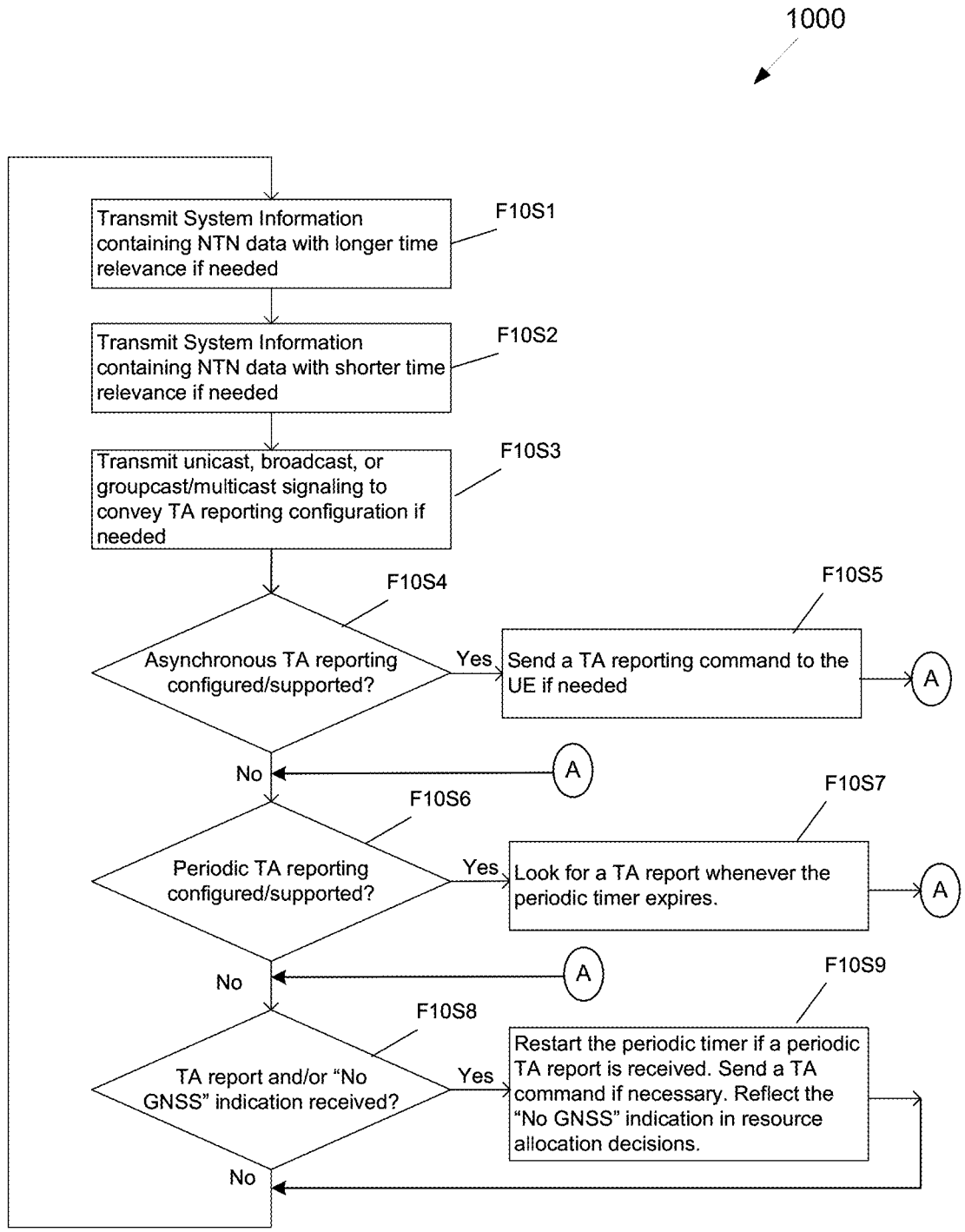
FIG. 10 illustrates a flow diagram of an example gNB procedure in support of ephemeris and TA management according to embodiments of the present disclosure.

FIG. 10 illustrates a flow diagram of an example gNB procedure in support of ephemeris and TA management 1000 according to an embodiment of the present disclosure. The embodiment of the example gNB procedure in support of ephemeris and TA management 1000 illustrated in FIG. 10 is for illustration only. FIG. 10 does not limit the scope of this disclosure to any particular implementation of the example gNB procedure in support of ephemeris and TA management 1000.

In operation F10S1, the gNB transmits ephemeris data that has a relatively longer time relevance in System Information. Such data may be included in an existing SIB from Release 16 or a new SIB in Release 17 and beyond. Such SIB is transmitted at a periodicity known to the UEs in the cell and may be fixed or configurable. In an example embodiment, the gNB specifies NTN-GW coordinates so that the UE can estimate the UE-gNB Round Trip Delay (RTD) or Round Trip Time (RTT). Transmission of NTN-GW coordinates is a better alternative to transmission of the feeder link delay, because of higher accuracy and more efficient signaling. When appropriate, information about more than one NTN-GW is specified (e.g., in support of an anticipated change in the NTN-GW). In another embodiment, in operation F10S1, the gNB specifies the total processing delay between the UE and the gNB and reflects the processing delays in both directions, the UE-to-gNB and the gNB-to-UE. The total processing delay includes one or more of the following: the platform (e.g., satellite) processing time, the NTN-GW processing time, the gNB processing time, and the gNB-NTN-GW transport delay. In an example approach, the gNB may transmit its coordinates in a SIB.

Prior to operation F10S1, a gNB exchanges messages with its NTN-GWs and platforms to obtain typical platform and NTN-GW processing times in an embodiment of the disclosure. In another approach, the gNB may obtain these times from OAM or other system. The gNB also obtains or estimates the gNB-NTN-GW transport delay.

In operation F10S2, the gNB transmits the data that has a relatively shorter time relevance in System Information. Such data may be included in an existing SIB from Release 16 or a new SIB in Release 17 and beyond. Such SIB is transmitted at a periodicity known to the UEs in the cell and may be fixed or configurable. In an example embodiment, the gNB transmits selected elements of the ephemeris data or Earth-Centered Earth-Fixed (ECEF) Cartesian position coordinates (Px, Py, and Pz) coordinates and optionally instantaneous velocity (Vx, Vy, and Vz) (that have been derived from the ephemeris data) more frequently compared to the information mentioned in operation F10S1.

In an example embodiment of the disclosure, the absolute values of the position and the velocity are represented in one SIB and incremental values (i.e., the values relative to the absolute values) are specified in another SIB in a compact representation to reduce the amount of overhead.

In another example, different numbers of bytes are used to represent Px, Py, Pz, Vx, Vy, and Vz instead of the same number of bits for these parameters. In particular, the parameter that is not expected to change much from one SIB instance to the next can be represented by fewer bits.

In yet another example, the sensitivities of position and velocity estimation accuracies are considered to determine the sizes (i.e., the number of bytes) for Px, Py, Pz, Vx, Vy, and Vz. In such case, more bits are used In an embodiment of the disclosure, one or more of (Px, Py, Pz, Vx, Vy, and Vz) are encoded using a formula such as Eq. (1) below to reduce the number of bits in a SIB:

$$TV = \alpha * IV + \beta \qquad \text{Eq. (1)}$$

In Eq. (1), TV is the True Value of the quantity and IV is the Indicated Value specified in a SIB.

Expected ranges of (Px, Py, Pz, Vx, Vy, and Vz) are used to determine α and β. In a special case, β may be 0 and hence is not used. α and β are signaled in a SIB or pre-defined in specifications.

In an example approach, when signaled in a SIB, α and β are transmitted less frequently compared to IV. Furthermore, α and β can be different for all of (Px, Py, Pz, Vx, Vy, and Vz) or the same α and β can be shared for multiple quantities.

In another example approach, one or more tables are defined in the standard to represent the relationship between TV and IV for a given quantity. The IV can then be simply an index to the table entry.

Information in operations F10S1 and F10S2 is sent with a periodicity that is fixed or configurable (in which case, this periodicity is specified in a SIB). Such periodicities can be the same as, longer than, or shorter than the R16-supported SIB1 periodicity of 160 ms.

The platform ephemeris data or position and velocity data being specified by the gNB may correspond to the instant when the gNB is creating the relevant SIB. In an embodiment of the disclosure, such data may correspond to a future instant such as the instant when a UE in the center of the cell would receive such SIB. The UE may be aware of such instant through a procedure defined in specifications or the gNB may provide an indication of the use of a future instant in a suitable SIB.

In an example approach, the gNB utilizes the real-time platform ephemeris data or position and velocity data provided by the NTN-GW and historical data to predict the platform ephemeris data or position and velocity data at a target future instant.

In an embodiment of the disclosure, the gNB, in operation F10S1 or operation F10S2, broadcasts the coordinates of the Reference Point of the cell to enable the UE to estimate the Reference Point-gNB delay. In another embodiment, the UE can use these coordinates to determine relative TA for reporting. This information can be used by UEs without timing pre-compensation capability, UEs without GNSS, and UEs that have a lack of the GNSS visibility temporarily. In another embodiment of the disclosure, the gNB broadcasts the Reference Point-gNB delay, which can be used by UEs without timing pre-compensation capability, UEs without GNSS, and UEs that have a lack of the GNSS visibility temporarily. Such delay can also be used by a UE to report incremental TA relative to the TA of the Reference Point.

In an embodiment of the disclosure, the gNB, in operation F10S1 or operation F10S2, includes a value flag that indicates if the long-term NTN data (e.g., selected elements of the platform ephemeris) has changed or not to avoid unnecessary SI processing at the UE.

If comprehensive long-term platform ephemeris data is provided to the UE in a file (e.g., on SIM or through Over-The-Air updates), the current or latest version number of such file is broadcast by the gNB in an embodiment of the disclosure so that the UE can acquire more recent ephemeris data (e.g., via application layer signaling).

If comprehensive long-term platform ephemeris data is provided to the UE in a file (e.g., on SIM or through Over-The-Air updates), in an embodiment of the disclosure, time and coordinates are represented in a compact manner to reduce the file size. For example, the full time and full coordinates may be specified in a limited number of records in the file and incremental times and coordinates are specified in the remaining records in the file.

While operations F10S1 and F10S2 are related to the platform ephemeris, operations F10S3 to F10S9 are related to the management of Timing Advance (TA).

In operation F10S3, in an example embodiment of the disclosure, the gNB conveys to the UE what type of TA reporting is configured for the UE via unicast signaling (e.g., an RRC Reconfiguration message), broadcast signaling (e.g., a SIB that is processed by all UEs in the cell), or groupcast/multicast signaling (e.g., a message that is processed by a subset of UEs in the cell).

In an embodiment of the disclosure, the reporting of TA may be asynchronous or on-demand, where the gNB may send a PHY indication (e.g., a DCI) or a MAC indication (e.g., a MAC CE) to the UE to obtain a TA report from the UE.

In another embodiment of the disclosure, the reporting of TA may be periodic, where the gNB configures a UE with periodicity of TA reporting.

In yet another embodiment of the disclosure, the reporting of TA may be implicit or rule-based, where the UE sends a TA when the TA change (i.e., the difference between the previously reported TA and the currently estimated TA) exceeds a threshold. In such case, in an example approach, the gNB configures the UE with such threshold. In another example approach, the threshold is pre-defined in specifications.

In one embodiment of the disclosure, the reporting of TA is absolute (i.e., the full TA), and, in another embodiment, the incremental TA is reported.

In yet another embodiment of the disclosure, the TA (full or incremental) may be an index to a table entry or a formula such as Eq. (1) is used, where TV is the TA estimated by the UE (full or incremental) and the IV is the TA value contained in the TA report.

One or multiple TA reporting methods can be used simultaneously for a given UE. Furthermore, one or more TA reporting methods may be mandatory for the UE to support.

In operation F10S4, the gNB checks if it wants to use asynchronous TA reporting. If yes, operation F10S5 is executed. Otherwise, operation F10S6 is executed.

In operation F10S5, the gNB determines if it needs or wants to send a command to the UE to obtain an asynchronous or on-demand TA report. For example, if a long time has passed since the last reception of a TA report or the UE's UL does not appear to be in sync or appears to be getting out of sync per gNB determination, the gNB may ask the UE via PHY or MAC signaling to send a TA report.

In operation F10S6, the gNB checks if periodic TA reporting has been configured for the UE or not. If not, it goes to operation F10S8. If yes, in operation F10S7, the gNB observes the periodic timer value and if the timer is about to expire, the gNB waits for an incoming TA report from the UE.

In operation F10S8, the gNB checks if a TA report has been received from the UE or not. If not, the gNB goes to operation F10S1. If yes, the gNB processes the received TA report received from the UE and sends any TA adjustment if needed. Furthermore, if the timer for the periodic TA reporting has expired, such timer is restarted in preparation for a new TA report.

In an example embodiment in operation F10S8, the gNB may receive an indication from the UE that the UE currently does not have GNSS visibility. Such indication may be specified in the TA report itself in an example approach. In such case, one bit may indicate such lack of visibility of the GNSS at the current instant. In another approach, one TA report value itself (e.g., all 0s or all 1s or any other suitable bit pattern) may indicate the lack of visibility of the GNSS. The gNB may decide to accommodate a larger time difference between the DL and the UL (e.g., (i) between UL resource allocation and UL data transmission and (ii) between DL transmission and ACK/NACK transmission in the UL).

The TA report itself may be received by the gNB via PHY, MAC, or RRC signaling or along with the UL data in a suitable header.

In another embodiment of the disclosure, in operation F10S8, the gNB receives the lack of GNSS visibility indication via PHY signaling (e.g., as a UCI), MAC signaling (e.g., as part of a MAC CE), or RRC signaling or along with the UL data in a suitable header. The gNB can then possibly allow a longer time margin between the DL and the UL processing in an implementation-specific manner.

Figure 11:
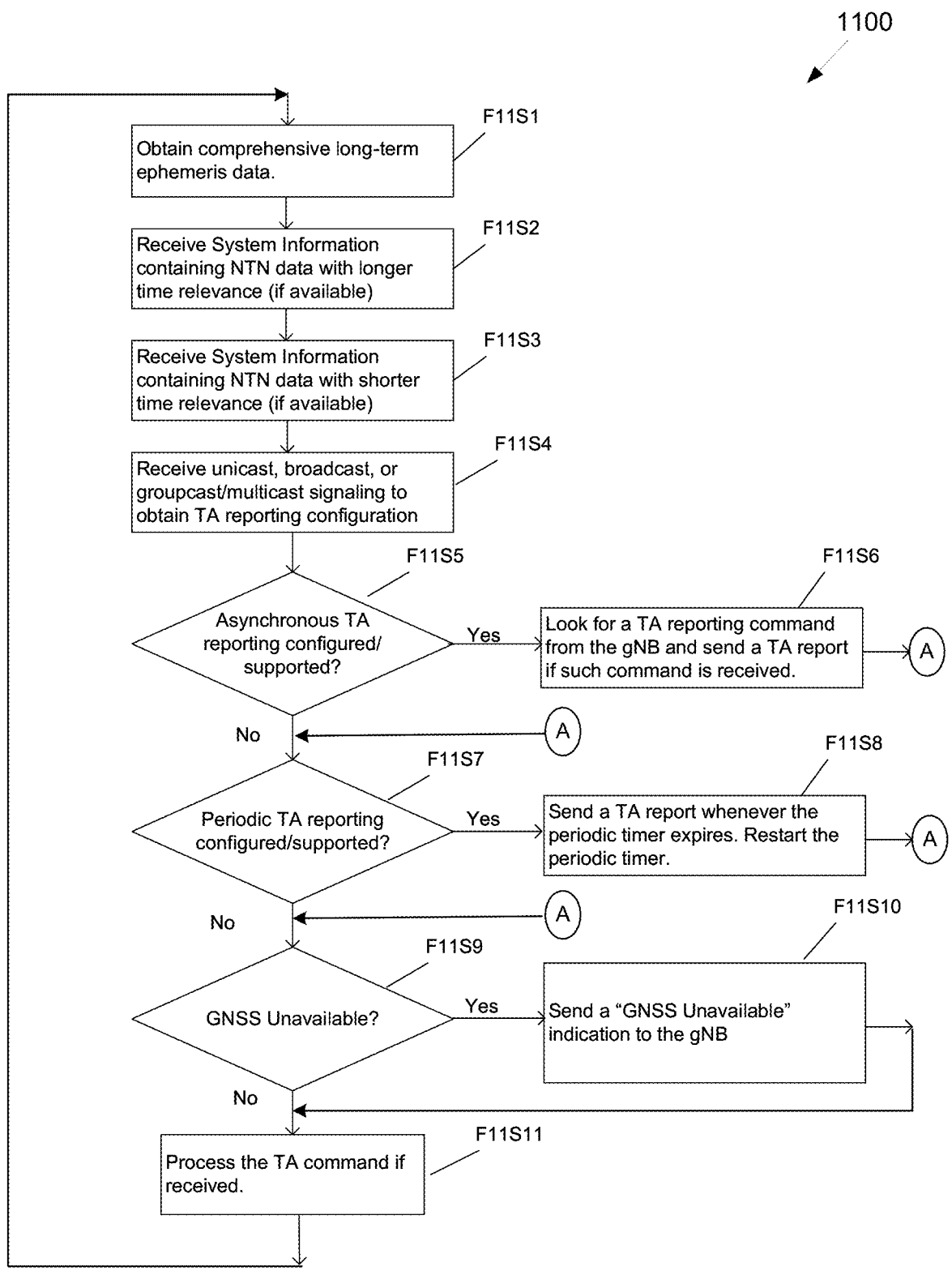
FIG. 11 illustrates a flow diagram of an example UE procedure in support of ephemeris and TA management according to embodiments of the present disclosure.

FIG. 11 illustrates a flow diagram of an example UE procedure in support of ephemeris and TA management 1100 according to an embodiment of the present disclosure. The embodiment of the example UE procedure in support of ephemeris and TA management 1100 illustrated in FIG. 11 is for illustration only. FIG. 11 does not limit the scope of this disclosure to any particular implementation of the example UE procedure in support of ephemeris and TA management 1100.

In operation F11S1, the UE receives comprehensive long-term ephemeris through SIM provisioning or an NTN (e.g., in a SIB). In an example embodiment of the disclosure, such data is received by the UE from an Application Server or an OAM system via a Terrestrial Network (TN) such as a cellular network or a WiFi network. In another embodiment of the disclosure, if comprehensive long-term platform ephemeris data is provided to the UE in a file (e.g., on SIM or through Over-The-Air updates via a TN or an NTN), time and coordinates are represented in a compact manner to reduce the file size. For example, the full time and full coordinates may be specified in a limited number of records in the file and incremental times and coordinates are specified in the remaining records in the file.

In operation F11S2, the UE processes one or more SIBs containing the ephemeris data that has a relatively longer time relevance. Such data may be included in an existing SIB from Release 16 or a new SIB in Release 17 and beyond. Such SIB is transmitted at a periodicity known to the UEs in the cell and may be fixed or configurable. In an example embodiment, the UE utilizes the NTN-GW coordinates to estimate the UE-gNB RTD or RTT; see Eq. (E2) below. In another embodiment, in operation F11S2, the UE receives the total processing delay between the UE and the gNB and makes use of this delay in Eq. (E2). The total processing delay includes one or more of the following: the platform (e.g., satellite) processing time, the NTN-GW processing time, the gNB processing time, and the gNB-NTN-GW transport delay. The UE may also receive the coordinates of the gNB in a SIB.

In operation F11S3, the UE receives the data that has a relatively shorter time relevance in System Information. Such data may be included in an existing SIB from Release 16 or a new SIB in Release 17 and beyond. Such SIB is transmitted at a periodicity known to the UEs in the cell and may be fixed or configurable. In an example embodiment, the UE receives selected elements of the ephemeris data or Earth-Centered Earth-Fixed (ECEF) Cartesian position coordinates (Px, Py, and Pz) coordinates and optionally instantaneous velocity (Vx, Vy, and Vz) (that have been derived from the ephemeris data) more frequently compared to the information mentioned in operation F11S2. When applicable, the UE uses a formula defined in specifications such as Eq. (1) to obtain one or more of (Px, Py, Pz, Vx, Vy, and Vz). In another example approach, the UE uses one or more tables defined in the standard to represent the relationship between TV and IV for a given quantity in Eq. (1).

In an example embodiment of the disclosure, the UE carries out predictive estimation of the current positions and/or velocities of the platform by considering the difference between the instant associated with such information and the instant when such information is used by the UE. For example, the UE may do linear or nonlinear extrapolation to more accurately estimate the platform's position and velocity at the instant such information is needed.

In an embodiment of the disclosure, if the gNB, in operation F11S1 or operation F11S3, has broadcast the coordinates of the Reference Point of the cell, the UE utilizes the Reference Point coordinates to estimate the Reference Point-gNB delay when needed. In another embodiment, the UE uses the Reference Point coordinates to determine relative TA for TA reporting. This information can be used by UEs without timing pre-compensation capability, UEs without GNSS, and UEs that have a lack of the GNSS visibility temporarily. In another embodiment of the disclosure, if the gNB has broadcast the Reference Point-gNB delay, UEs without timing pre-compensation capability, UEs without GNSS, and UEs that have a lack of the GNSS visibility temporarily can make use of such delay for timing pre-compensation. Such delay can also be used by a UE to report incremental TA relative to the TA of the Reference Point.

If the gNB, in operation F11S2 or operation F11S3, has included a value flag that indicates if the long-term NTN data (e.g., selected elements of the platform ephemeris) has changed or not, the UE uses such flag to decide whether to obtain the long-term NTN data or not. For example, if the value flag stored in the UE and the value flag transmitted by the gNB match, the UE already has the latest long-term data and the UE skips processing the SI containing the long-term NTN data. In contrast, if these value flags do not match, the UE carries out further processing of System Information to obtain the new long-term NTN data.

If comprehensive long-term platform ephemeris data is provided to the UE in a file (e.g., on SIM or through Over-The-Air updates) and if the current or latest version number of such file is broadcast by the gNB in an embodiment of the disclosure, the UE acquires more recent ephemeris data (e.g., via application layer signaling) if the version number associated with its currently stored data does not match with the version number being broadcast by the gNB.

In FIG. 11, operations F11S1, F11S2, F11S3 are related to the platform ephemeris, and operations F11S4 to F11S10 are related to the management of TA.

In operation F11S4, in an example embodiment of the disclosure, the UE obtains the type of TA reporting configuration from the gNB via unicast signaling (e.g., an RRC Reconfiguration message), broadcast signaling (e.g., a SIB that is processed by all UEs in the cell), or groupcast/multicast signaling (e.g., a message that is processed by a subset of UEs in the cell).

In an embodiment of the disclosure, in case the reporting of TA is configured to be asynchronous or on-demand, where the UE expects to receive a PHY indication (e.g., a DCI) or a MAC indication (e.g., a MAC CE) from the gNB for TA reporting.

In another embodiment of the disclosure, if the UE is configured for periodic reporting of TA, the UE receives the periodicity of TA reporting.

In yet another embodiment of the disclosure, the reporting of TA may be implicit or rule-based, where the UE is expected to send a TA when the TA change (i.e., the difference between the previously reported TA and the currently estimated TA) exceeds a threshold. In such case, in an example approach, the UE receives such threshold from the gNB.

In one embodiment of the disclosure, if the UE stores the type of TA reporting: (i) absolute or full TA reporting or (ii) incremental TA reporting.

In yet another embodiment of the disclosure, the TA (full or incremental) may be an index to a table entry or a formula such as Eq. (1) is used, where TV is the TA estimated by the UE (full or incremental) and the IV is the TA value contained in the TA report.

One or multiple TA reporting methods can be used simultaneously for a given UE. Furthermore, one or more TA reporting methods may be mandatory for the UE to support.

In operation F11S5, the UE checks if asynchronous TA reporting has been configured by the gNB. If yes, operation F11S6 is executed. Otherwise, operation F11S7 is executed.

In operation F11S6, the UE checks if the gNB has sent a command for an asynchronous or on-demand TA report. If the UE has received such command from the gNB, it sends a TA report to the gNB and goes to operation F11S7.

In operation F11S7, the UE checks if periodic TA reporting has been configured by the gNB or not. If not, it goes to operation F11S9. If yes, in operation F11S8, the UE observes the periodic timer value and if the timer has expired, the UE sends a TA report to the gNB, resets the periodic timer, and goes to operation F11S9.

In operation F11S9, in an example embodiment of the disclosure, the GNSS-capable UE checks if the GNSS is available or not. If it is not available, the UE goes to operation F11S10. Otherwise, the UE goes to operation F11S11.

In operation F11S10, the UE sends a "GNSS Unavailable" indication to the gNB and goes to operation F11S11.

In operation F11S11, the UE checks if the gNB has sent a TA command. If not, the UE goes to operation F11S1. If the gNB has sent a TA command, the UE considers this TA command to make adjustment to its UL timing and goes to operation F11S1.

In FIG. 11, the UE sends the TA report to the gNB via PHY, MAC, or RRC signaling or along with the UL data in a suitable header.

Figure 12:
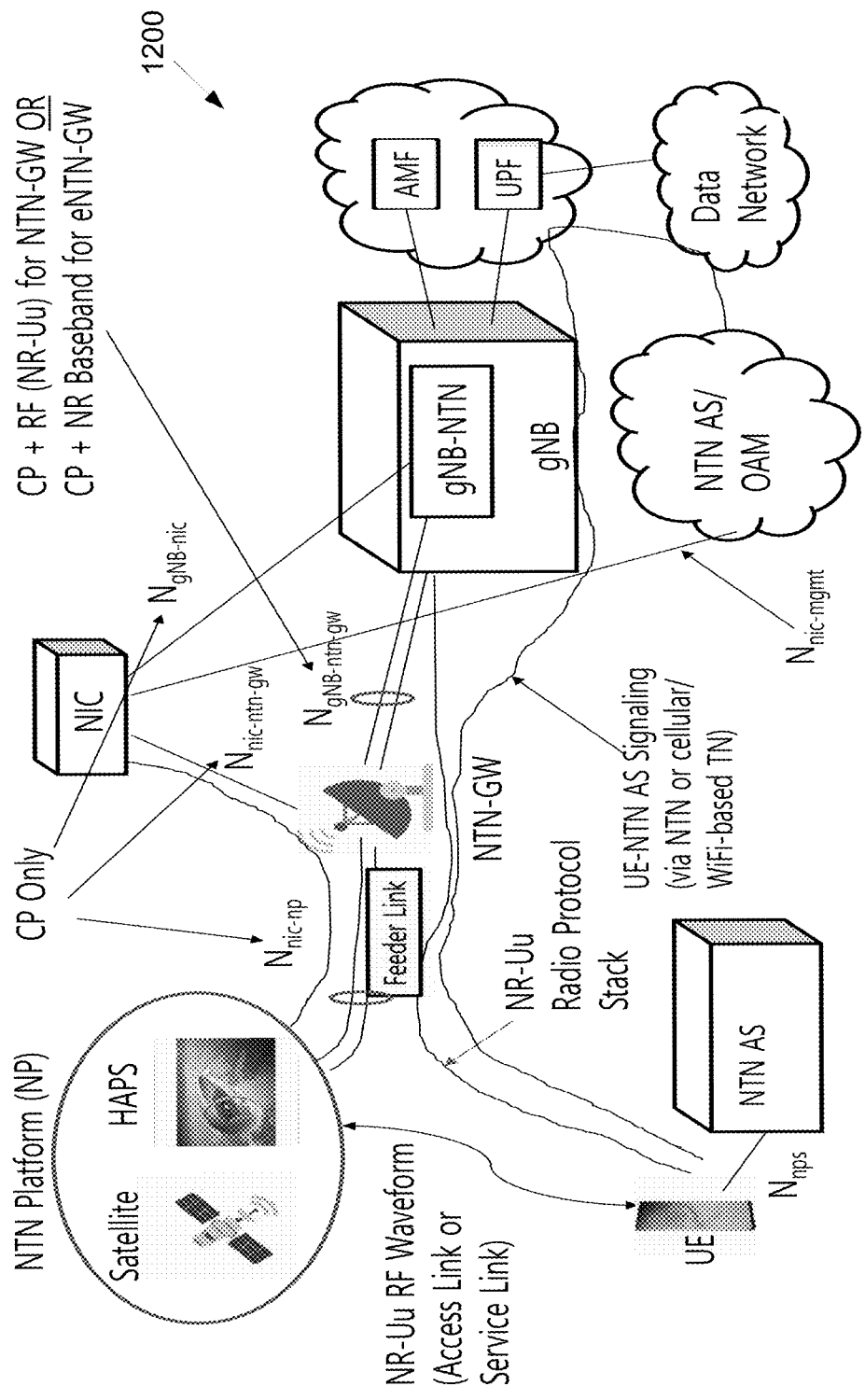
FIG. 12 illustrates a proposed architecture in support of the management of time, ephemeris, and other aspects of the NTN according to embodiments of the present disclosure.

FIG. 12 illustrates a proposed architecture in support of the management of time, ephemeris, and other aspects of the NTN 1200 according to an embodiment of the present disclosure. The embodiment of the proposed architecture in support of the management of time, ephemeris, and other aspects of the NTN 1200 illustrated in FIG. 12 is for illustration only. FIG. 12 does not limit the scope of this disclosure to any particular implementation of the proposed architecture in support of the management of time, ephemeris, and other aspects of the NTN 1200.

The architecture illustrated in FIG. 12 is suitable for a transparent payload and an integrated gNB. An integrated gNB combines the functions of the gNB-DU (gNB-Distributed Unit) and the gNB-CU (gNB-Central Unit).

The UE can be provided short-term and long-term NTN data using one or more network functions and one of the access networks. (e.g., a TN using a cellular access or WiFi access or an NTN).

In FIG. 12, a Network Platform (NP) is an NTN entity that is space-borne (e.g., satellites) or air-borne (e.g., HAPS). The Network Infrastructure (NI) consists of the NTN platforms and the NTN GWs. The NTN Infrastructure Controller (NIC) is an implementation-specific controller for the NTN infrastructure (e.g., satellites/HAPS and NTN-GWs). It is a proxy for the NI and interfaces with traditional 5G Network Functions (NFs). It exchanges long-term and delay-insensitive info with suitable 5G NFs. For example, the NIC provides IP addresses and (lat, long) locations of NTN-GWs to the gNB or gNB-NTN. The NIC obtains information about the platform via the NTN-GW. An Application Server (AS) provides long term NTN data such as long term satellite ephemeris to the UE via a wireline or wireless connection to the NTN UE. For example, such data may be stored on Universal Subscriber Identity Module (USIM) or UE's memory as appropriate. A gNB-NTN is an optional logical function inside the gNB that interfaces with the NI for signaling related to the NI. For example, the gNB-NTN exchanges real-time or near-real-time NTN data such as the (position, velocity, and time) vectors of the satellite with the NTN-GW. Furthermore, the gNB-NTN exchanges long-term data such as information about selected orbital parameters and the NTN-GW capabilities or processing with the NTN-GW or the NIC. The NTN-GW capabilities include the presence or absence of modification of the platform-provided (P,V,T) parameters.

The NTN-GW has two connections with the gNB or the gNB-NTN: (i) Control Plane connection to exchange signaling messages such as gNB and NTN-GW processing capabilities (e.g., modification of the original (P,V,T) data) and (P,V,T) parameters and (ii) the NR-Uu waveform to be transmitted in the cell or received in the cell from all NTN UEs.

The eNTN-GW implements traditional NTN-GW functions and supports NR baseband signal instead of the NR RF signal. Protocols such as eCPRI can then be used between the gNB and the eNTN-GW for enhanced reliability by exploiting a high-speed optical fiber-based wireline interface instead of a wireless interface.

The transport of CP signaling and NR-specific signals (e.g., RF or baseband signals) between the NTN-GW (or eNTN-GW) and the gNB (or gNB-NTN) can initially be implementation-specific (i.e., beyond the 3GPP scope) and can be made open in future per industry interest.

The Feeder Link also has two connections between the platform and the gnB or the gNB-NTN: (i) Control Plane connection to exchange signaling messages containing (P,V,T) parameters and (ii) the NR-Uu waveform to be transmitted in the cell or received in the cell from all UEs.

In general, the following connections can be a wireline connection (e.g., an optical fiber in an IP network or a Metro Ethernet network) or a wireless connection (e.g., using microwave dish antennas): (i) Nnic-ntn-gw, (ii) NgNB-nic, (iii) NgNB-ntn-gw, (iv) Nnic-mgmt.

The gNB-DU may be co-located with NTN-GW/eNTN-GW or non-co-located with NTN-GW/eNTN-GW.

Figure 13:
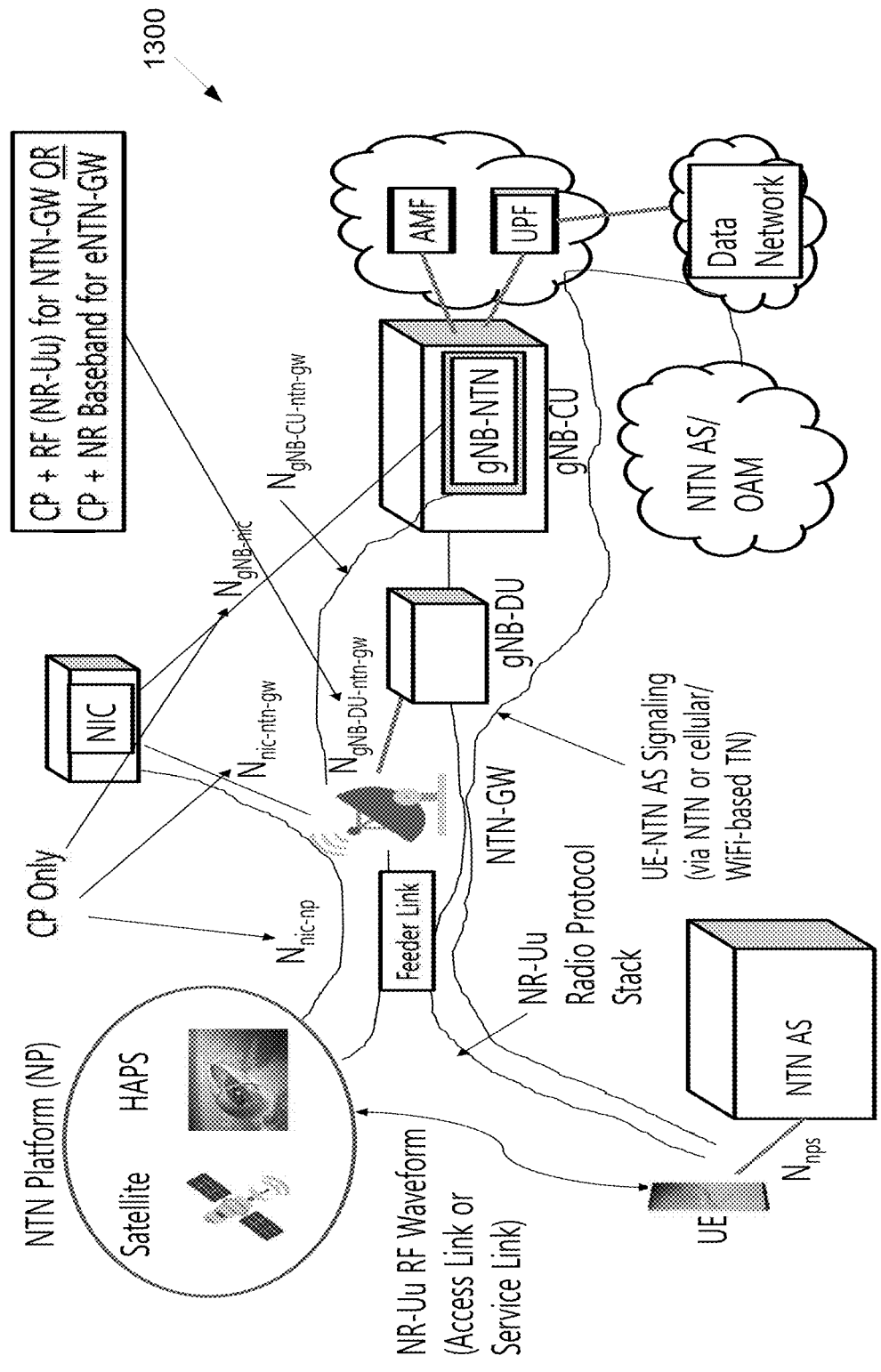
FIG. 13 illustrates a proposed architecture in support of the management of time, ephemeris, and other aspects of the NTN according to embodiments of the present disclosure.

FIG. 13 illustrates a proposed architecture in support of the management of time, ephemeris, and other aspects of the NTN 1300 according to an embodiment of the present disclosure. The embodiment of the proposed architecture in support of the management of time, ephemeris, and other aspects of the NTN 1300 illustrated in FIG. 13 is for illustration only. FIG. 13 does not limit the scope of this disclosure to any particular implementation of the proposed architecture in support of the management of time, ephemeris, and other aspects of the NTN 1300.

The architecture illustrated in FIG. 13 is suitable for a transparent payload and a disaggregated or decomposed gNB. The disaggregated gNB has two separate entities, the gNB-DU and the gNB-CU.

In an example embodiment of the disclosure, information about the transmit power of the NTN platform, and receive power (e.g., receive sensitivity) of the NTN platform is conveyed to the gNB by an entity. Such entity could be the NTN platform, the NTN-GW, an NTN controller, OAM, or an Application Server. In an example approach, the power transmitted by the platform is made available to the gNB so that gNB knows what to broadcast in SIB.

In an embodiment of the disclosure, when the gNB broadcasts the ephemeris data for the serving cell and neighbor cells, only distinct satellite ephemeris data are included instead of replicating the same satellite ephemeris for multiple cells to reduce signaling overhead. For example, if multiple cells belong to the same satellite, the ephemeris data for the satellite is not repeated for all these cells.

In an embodiment of the disclosure, the UE makes use of the time delay related information broadcast by the gNB to facilitate its operations in the following cases: (i) the UE has a GNSS capability but does not currently have an accurate or reliable GNSS-based location (e.g., due to poor GNSS visibility), (ii) the UE has a GNSS capability but does not have a pre-compensation capability, and (iii) the UE does not have a GNSS capability.

In an embodiment of the disclosure, for the cases specified above, the UE utilizes the delay information broadcast by the gNB to determine setting of timers at various protocol layers such as drx-HARQ-RTT-TimerUL, drx-HARQ-RTT-TimerDL, ra-Response Window, ra-ContentionResolution-Timer, and sr-ProhibitTimer. When the UE has reliable/accurate knowledge of UE-specific UE-gNB delay, the UE can add an offset before these timers are started or the existing timer values (e.g., defined up to Release 16) are increased by the amount of the UE-gNB delay; both of these approaches are equivalent. In an example embodiment of the disclosure, the UE without the reliable GNSS-based self-location estimates the UE-gNB delay by using the delay information broadcast by the gNB for the three cases mentioned above. Details of the "delay information" are given below.

In one approach, the delay information includes the gNB-estimated gNB-to-Reference Point delay, where the Reference Point may correspond to the delay between the gNB and an average location (e.g., cell center). In another approach, the Reference Point corresponds to the location in the cell that has the minimum propagation delay. Either one-way delay or the round trip delay is specified by the gNB.

In an example approach, the delay includes only the propagation delay. In another approach, the delay is the total delay that includes one or more of processing delays (e.g., NTN platform processing and NTN-GW processing) and transport delays (e.g., NTN-GW-gNB transport delay). In an example embodiment of the disclosure, the gNB may indicate the type of delay(s) it is broadcasting.

In yet another approach, the delay is divided into multiple parts such as Service Link delay, Feeder Link delay, and (optionally) other miscellaneous delays (e.g., processing plus transport delays). In such case, the UE without an accurate/reliable GNSS-based location can use the explicit service link delay (if broadcast by the gNB) or the coordinates of the Reference Point (e.g., cell center or a point associated with minimum delay) to estimate the Service Link delay. The Feeder Link delay can be explicitly broadcast or the gNB may broadcast the NTN-GW coordinates.

In an example embodiment of the disclosure, the gNB may broadcast its own coordinates to enable UEs to estimate the feeder link delay.

In an example embodiment of the disclosure, if the UE's GNSS-based location is unavailable but the time is still accurate at the UE, the UE can estimate the UE-gNB delay by subtracting the transmit time of the SI broadcast by the gNB from the receive time of the relevant SI.

When a UE reports its location to the network, in an example embodiment of the disclosure, it indicates the confidence of this location accuracy quantitatively or qualitatively. For example, the UE may indicate that the GNSS is currently not visible. The UE may indicate that the location corresponds to the last-known GNSS-based location.

In an example embodiment of the disclosure, the UE calculates the total delay between the UE and the gNB as follows when the UE has accurate/reliable GNSS-based position available.

UE-gNB Total Delay="UE-specific UE-platform propagation delay"+"Common platform-NTN-GW propagation delay"+"Total Processing Delay"     Eq. (E1)

In Eq. (E1), the UE-specific UE-platform propagation delay is estimated by the UE based on the platform's coordinates broadcast by the gNB in SI and its own GNSS-based position. In an example approach, the distance between the UE and the platform I divided by the speed of light (e.g., 3×108 m/s) to determine the propagation delay between the UE and the platform.

In Eq. (E1), "Common platform-NTN-GW propagation delay" (also known as "Feeder link delay") may be broadcast by the gNB in SI in an example approach. In another approach, NTN-GW coordinates (or even gNB coordinates as a proxy) and the platform coordinates are used to determine the propagation delay between the platform and the NTN-GW instead of time-varying feeder link delay.

In Eq. (E1), "Total Processing Delay" is the sum of the following:
 (i) the addition of two or more of these: minimum or typical processing delays at the platform, the NTN-GW, and gNB and
 (ii) NTN-GW-gNB transport delay, which could be specified as part of minimum performance specifications, a default assumption, or broadcast by the gNB in SI.

The round trip time (RTT) between the UE and the gNB can be estimated by the UE (with an assumption of symmetry) as UE-gNB RTT=2*UE-gNB Total Delay     Eq. (E2)

In another embodiment of the disclosure, if a UE does not have pre-compensation capability or if GNSS is currently unavailable (or a threshold time of X ms has elapsed since an accurate GNSS-based position was available) or if a UE has no GNSS capability, the UE can estimate the UE-gNB total delay using Eq. (E3) below.

UE-gNB Total Delay="Common Reference Point-platform propagation delay"+"Common platform-NTN-GW propagation delay"+"Total Processing Delay"Eq.     (E3)

In Eq. (E3), "Common Reference Point-platform propagation delay" is the propagation delay between the common Reference Point (e.g., the center of the serving cell or another suitable point on the geographic area being illuminated by the cell's beam) and the platform.

In an example approach, "Total Processing Delay: may be set to 0 in Eq. (E3).

Additional Embodiments for the TA Reporting

In an embodiment of the disclosure, the UE sends a TA in a MAC CE during the Random Access procedure based on such reporting being enabled or disabled by the gNB in a SIB in operation F9S6. For example, the gNB specifies an indicator taReportingEnabled in a SIB (e.g., SIB1, non-SIB2, or a new NTN SIB). If this indicator is 1 (or "0"), the UE reports the TA in a MAC CE during the RA procedure. In another example approach, taReporting is not explicitly included in a SIB and its presence or absence implies that UE should send the TA report to the gNB during the RA procedure or not.

In another embodiment of the disclosure, when the UE receives the TA Reporting Configuration via RRC signaling, such configuration (including the TA reporting being enabled or disabled) supersedes the TA reporting indicator that the UE has received via a SIB.

In another embodiment of the disclosure, if the UE has moved into a new cell in any RRC state (e.g., due to cell reselection or handover), the UE uses the TA reporting configuration including enabling/disabling of TA reporting feedback indicator if such indicator is received implicitly (e.g., absence or presence of an IE) or explicitly. If such indicator is not received for the new cell via dedicated RRC signaling, the UE uses the indicator obtained via a SIB.

In an embodiment of the disclosure, TA reporting configuration is specified by the gNB in operation F9S6 in a SIB (e.g., a SIB enhanced for an NTN or a new NTN SIB) to save radio resources associated with specifying the TA reporting configuration via dedicated signaling to many UEs in operation F9S10.

In an embodiment of the disclosure, the UE considers the priority of a MAC CE containing the TA report to determine whether to send such MAC CE during the RA procedure (e.g., in msgA or msg3/msg5) or later. In an example approach, if the UE is unable to send the MAC CE in msgA, msg3, or msg5, the UE sends the MAC CE at the first opportunity where adequate uplink resources are available to send the MAC CE containing the TA report.

In another embodiment of the disclosure, the MAC CE containing the TA report is given a higher priority than the MAC CE containing the power headroom report. In another approach, the MAC CE containing the TA report is given a lower priority than the MAC CE containing the power headroom report.

In yet another approach, the MAC CE containing the TA report and the MAC CE containing the power headroom report are given equal priority, and the UE selects which MAC CE to send to the gNB. In another example approach, the UE prioritizes sending of the MAC CE containing the Power Headroom report compared to the TA reporting MAC CE if its power headroom is less than a threshold (e.g., phrReportingThreshold).

Figure 14:
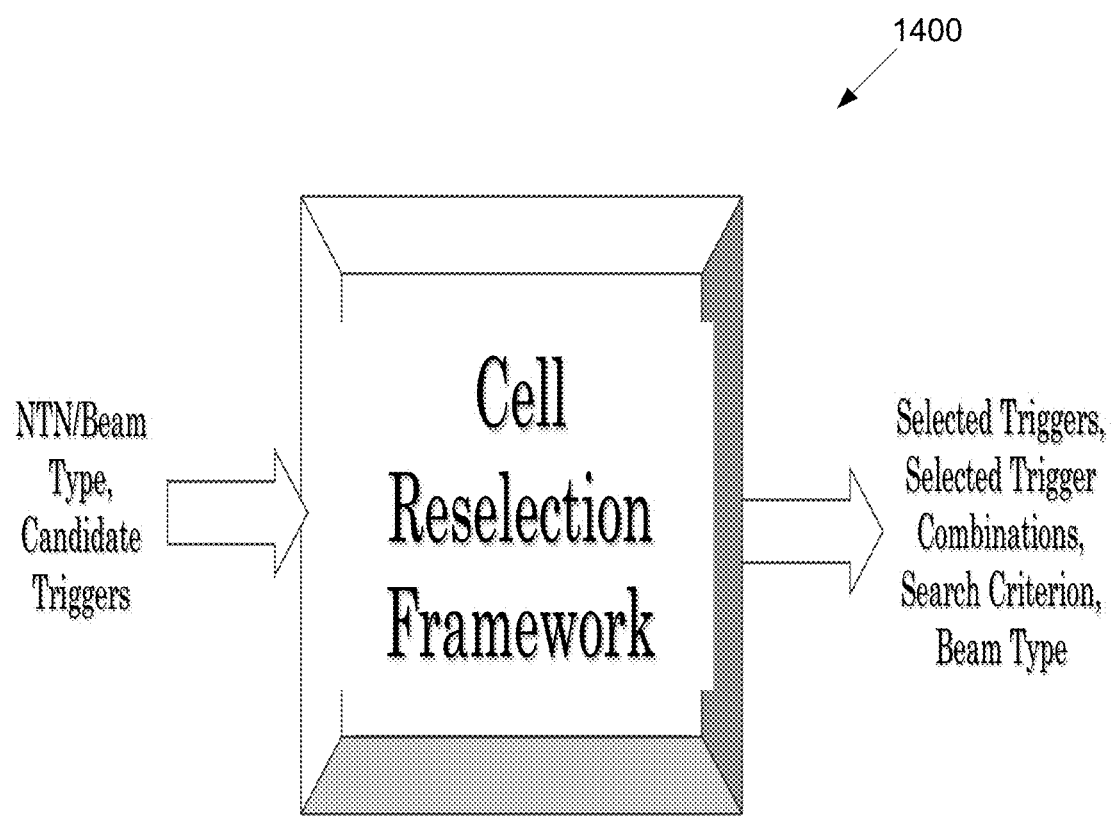
FIG. 14 illustrates an example of a mechanism of a flexible cell reselection framework according to embodiments of the present disclosure.

In another embodiment of the disclosure, the traditional cell reselection method is not suitable for an NTN that has different types of beams, especially due to the satellite movement and due to RSRPs of the serving cell and neighbor cells being quite similar. Hence, to enhance reliability of cell reselection, a new approach is needed for an NTN FIG. 14 illustrates an example of a mechanism of a flexible cell reselection framework 1400 according to embodiments of the present disclosure. The embodiment of the mechanism of a flexible cell reselection framework 1400 illustrated in FIG. 14 is for illustration only. FIG. 14 does not limit the scope of this disclosure to any particular implementation of the mechanism of a flexible cell reselection framework 1400.

As illustrated in FIG. 14, a gNB receives information, such as NTN/beam type and candidate triggers, and transmits information regarding selected triggers, selected trigger combinations, search criteria, and beam type.

Figure 15:
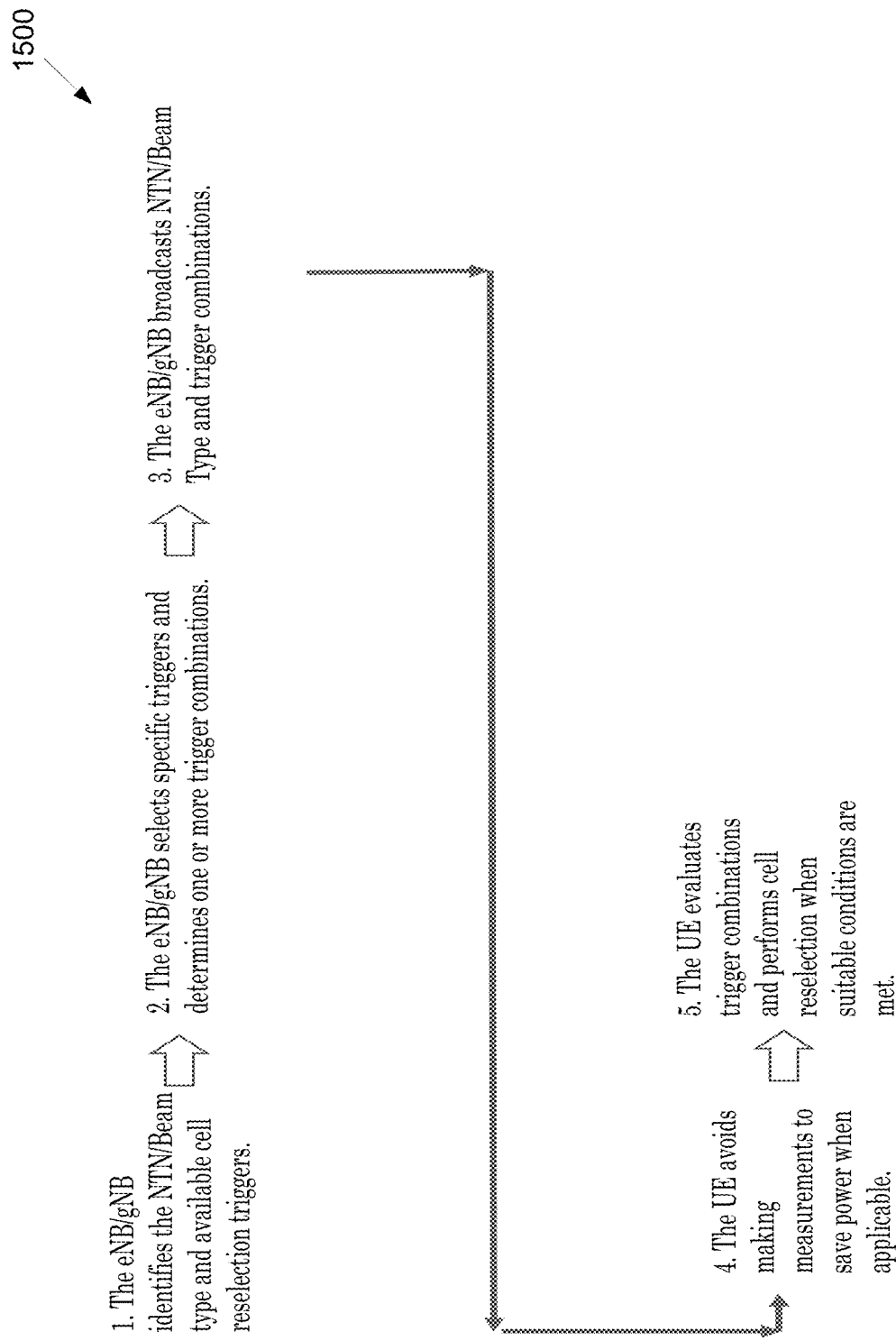
FIG. 15 illustrates an example of operations for the implementation of flexible QoS according to embodiments of the present disclosure.

FIG. 15 illustrates an example of operations for the implementation of flexible QoS 1500 according to embodiments of the present disclosure. The embodiment of the operations for the implementation of flexible QoS 1500 illustrated in FIG. 15 is for illustration only. FIG. 15 does not limit the scope of this disclosure to any particular implementation of the operations for the implementation of flexible QoS 1500.

As illustrated in FIG. 15, the eNB/gNB identifies the NTN/beam type and available cell reselection triggers. The eNB/gNB selects specific triggers and determines one or more trigger combinations. The eNB/gNB broadcasts NTN/type and trigger combinations. The UE avoids making measurements to save power when applicable. The UE evaluates trigger combinations and performs cell reselection when suitable conditions are met.

Figure 16:
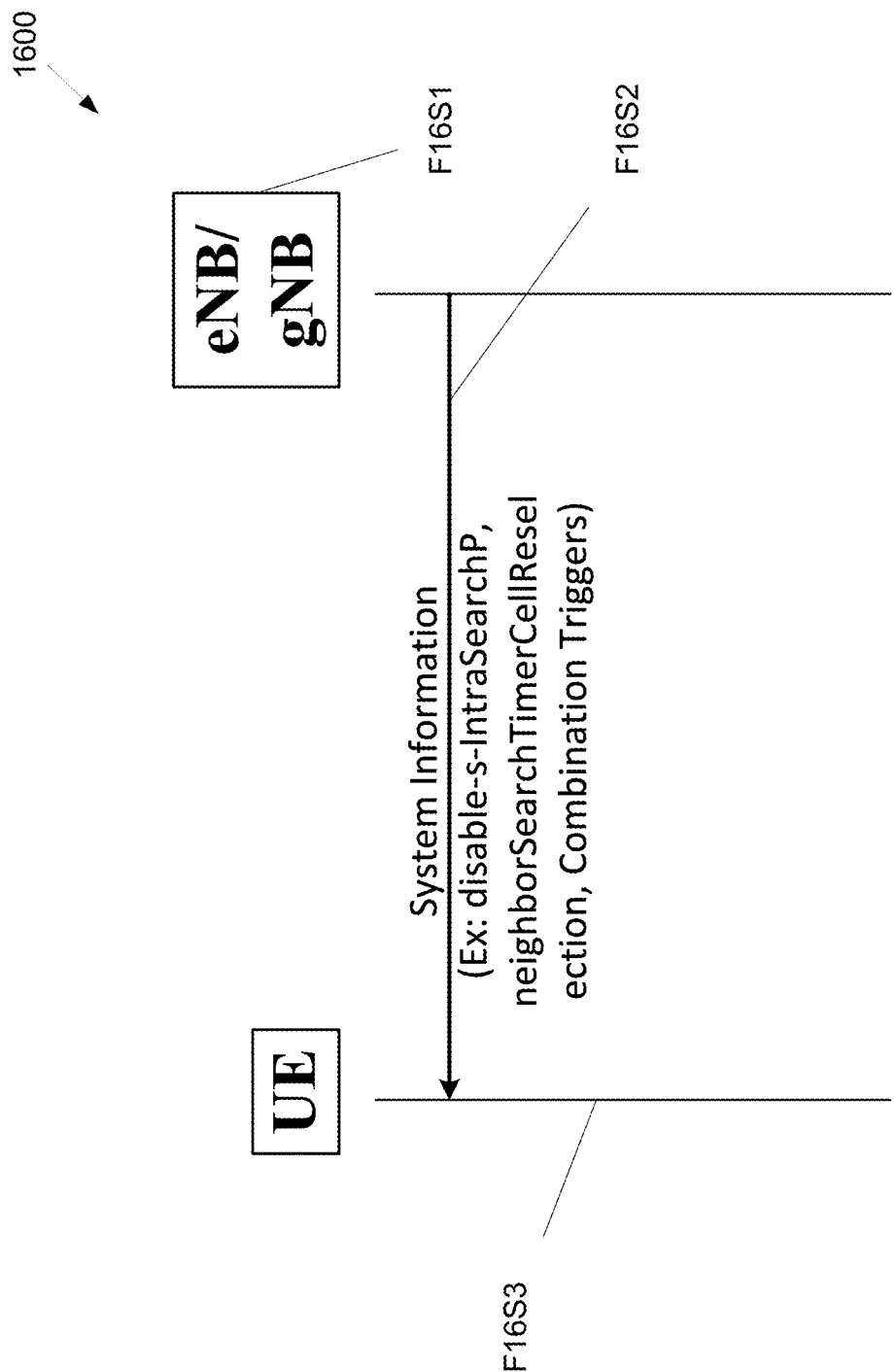
FIG. 16 illustrates an example overall UE-network procedure for a flexible cell reselection framework in an NTN according to embodiments of the present disclosure.

FIG. 16 illustrates an example overall UE-network procedure for a flexible cell reselection framework in an NTN 1600 according to embodiments of the present disclosure.

The embodiment of the overall UE-network procedure for a flexible cell reselection framework in an NTN 1600 illustrated in FIG. 16 is for illustration only. FIG. 16 does not limit the scope of this disclosure to any particular implementation of the overall UE-network procedure for a flexible cell reselection framework in an NTN 1600.

In operation F16S1, the gNB/eNB obtains its configuration including Beam Type for each of its cells. In one approach, the Beam Type distinguishes among three types of beams: Earth-fixed, quasi-Earth-fixed (also known as steerable beams), and Earth-moving (i.e., fixed non-steerable beams). For example, geostationary or geosynchronous satellites have Earth-fixed beams that illuminate the same geographic area all the time. Non-geostationary or geosynchronous satellites (e.g., LEOs and MEOs) may have Earth-moving beams that continuously move and illuminate different geographic areas at different times on a continuous basis. Non-geostationary or Non-geosynchronous satellites may have quasi-Earth-fixed beams that illuminate a given geographic area for some time period and then illuminate a different geographic area for a different time period.

In operation F16S2, in an example embodiment of the disclosure, the gNB/eNB sends one or more parameters in System Information to help the UE save some processing power and to enable a robust cell reselection. In an example approach, in operation F16S2, the gNB/eNB sends one or more of these parameters: disable-s-IntraSearchP, neighborSearchTimerCellReselection, and parameters related to combination triggers in support of cell reselection. In an example implementation, disable-s-IntraSearchP indicates if the UE should use or ignore the broadcast value of s-IntraSearchP to determine the need for making measurements of neighboring cells. In another approach, disable-s-IntraSearchP indicates if the UE should use the broadcast values of s-IntraSearchP and IntraSearchQ to determine the need for making measurements of neighboring cells. In one implementation, the timer neighborSearchTimerCellReselection indicates how long the UE can skip making measurements of neighbor cells to save processing power and increase battery life. For example, when Beam Type is quasi-Earth-Fixed in a given NTN, the gNB/eNB sends the parameters disable-s-IntraSearchP and neighborSearchTimerCellReselection to (i) enable detection of neighbors by the UE even when the serving cell RSRP is strong and (ii) avoid making measurements of neighboring cells to save battery life after cell reselection has been performed. In an example implementation, the gNB/eNB specifies the combination triggers implicitly or explicitly so that the UE can evaluate cell reselection trigger conditions. See the description associated with FIG. 19 for details of combination triggers.

In another approach, the effect of disabling of s-IntraSearchP is achieved by choosing a suitable value of s-IntraSearchP in the specified range (e.g., a high value of s-IntraSearchP) such that the UE does not meet the condition of "$S_{rxlev} > S_{IntraSerachP}$ and $S_{qual} > S_{IntraSerachQ}$" to skip measurements and hence searches for neighbors even when the serving cell signal measurement (e.g., RSRP) is good. To ensure that the UE does not meet the condition of "$S_{rxlev} > S_{IntraSerachp}$ and $S_{qual} > S_{IntraSerachQ}$" from the perspective of s-IntraSearchQ, s-IntraSearchQ can be absent in System Information in one approach, making only s-IntraSearchP the sole determinant of the condition. In another approach, a suitable value of s-IntraSearchQ in the specified range (e.g., a high value of s-IntraSearchQ) can be chosen.

In operation F16S3, the UE utilizes the received parameters such as disable-s-IntraSearchP, neighborSearchTimerCellReselection, and parameters related to combination triggers to determine if it should make measurements of neighboring cells and when it should perform cell reselection.

Figure 17:
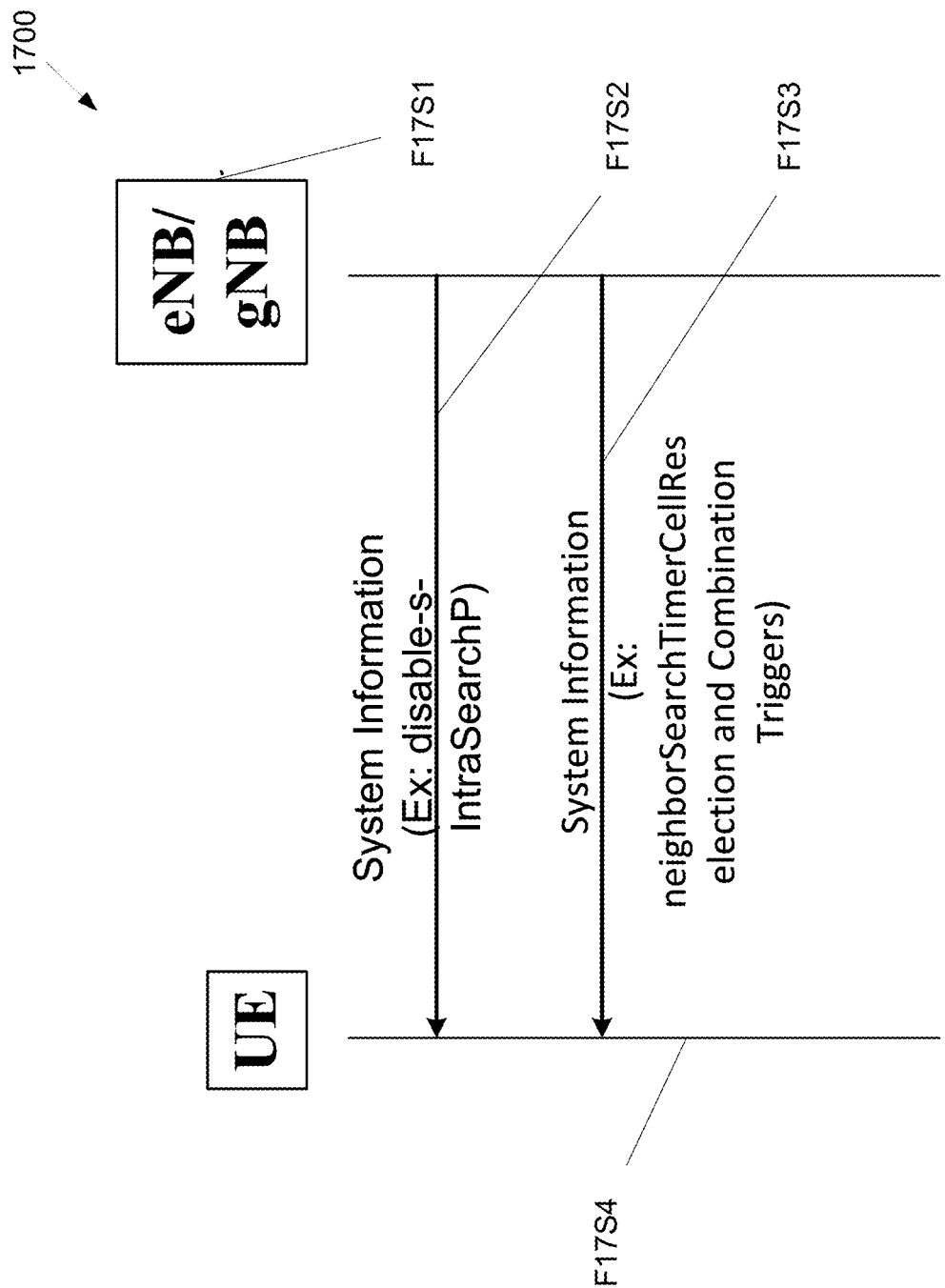
FIG. 17 illustrates an example overall UE-network procedure for a flexible cell reselection framework in an NTN according to embodiments of the present disclosure.

FIG. 17 illustrates an example overall UE-network procedure for a flexible cell reselection framework in an NTN 1700 according to embodiments of the present disclosure. The embodiment of the overall UE-network procedure for a flexible cell reselection framework in an NTN 1700 illustrated in FIG. 17 is for illustration only. FIG. 17 does not limit the scope of this disclosure to any particular implementation of the overall UE-network procedure for a flexible cell reselection framework in an NTN 1700.

In operation F17S1, (which is identical to operation F16S1), the gNB/eNB obtains its configuration including Beam Type for each of its cells. In one approach, the Beam Type distinguishes among three types of beams: Earth-fixed, quasi-Earth-fixed (also known as steerable beams), and Earth-moving (i.e., fixed non-steerable beams). For example, geostationary or geosynchronous satellites have Earth-fixed beams that illuminate the same geographic area all the time. Non-geostationary or geosynchronous satellites (e.g., LEOs and MEOs) may have Earth-moving beams that continuously move and illuminate different geographic areas at different times on a continuous basis. Non-geostationary or Non-geosynchronous satellites may have quasi-Earth-fixed beams that illuminate a given geographic area for some time period and then illuminate a different geographic area for a different time period.

In operation F17S2, in an example embodiment of the disclosure, the gNB/eNB sends disable-s-IntraSearchP if needed (e.g., when Beam Type is quasi-Earth-Fixed in a given NTN). In an example implementation, the gNB/eNB can convey this parameter in SIB2 that typically conveys s-IntraSearchP. In another implementation, the gNB/eNB conveys disable-s-IntraSearchP in a SIB that is not SIB2. For example, a new SIB defined for an NTN may carry disable-s-IntraSearchP.

In operation F17S3, the gNB/eNB conveys neighborSearchTimerCellReselection (if needed) and the parameters related to combination triggers in support of cell reselection in a new SIB, which may be specifically defined for an NTN. In an example implementation, the gNB/eNB sends neighborSearchTimerCellReselection when Beam Type is quasi-Earth-Fixed in a given NTN. In an example implementation, the gNB/eNB specifies the combination triggers implicitly or explicitly so that the UE can evaluate cell reselection trigger conditions. See the description associated with FIG. 19 for details of combination triggers.

In operation F17S4, which is identical to operation F16S3, the UE utilizes the received parameters such as disable-s-IntraSearchP, neighborSearchTimerCellReselection, and parameters related to combination triggers to determine if it should make measurements of neighboring cells and when it should perform cell reselection.

Figure 18:
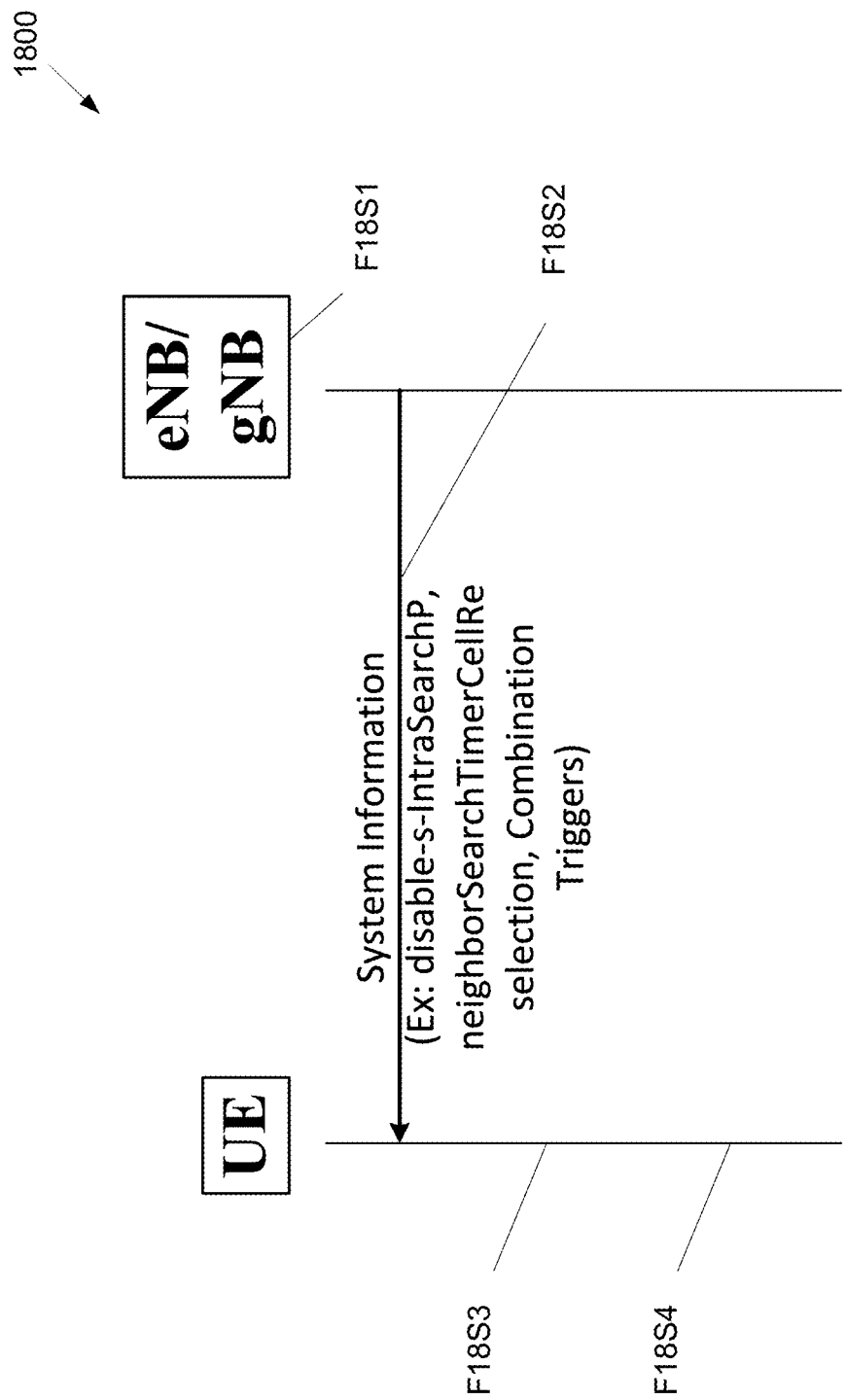
FIG. 18 illustrates an example UE procedure for a flexible cell reselection framework in an NTN according to embodiments of the present disclosure.

FIG. 18 illustrates an example UE procedure for a flexible cell reselection framework in an NTN 1800 according to embodiments of the present disclosure. The embodiment of the UE procedure for a flexible cell reselection framework in an NTN 1800 illustrated in FIG. 18 is for illustration only. FIG. 18 does not limit the scope of this disclosure to any particular implementation of the UE procedure for a flexible cell reselection framework in an NTN 1800.

In operation F18S1, (which is identical to operation F16S1 and operation F17S1), the gNB/eNB obtains its configuration including Beam Type for each of its cells. In one approach, the Beam Type distinguishes among three types of beams: Earth-fixed, quasi-Earth-fixed (also known as steerable beams), and Earth-moving (i.e., fixed non-steerable beams). For example, geostationary or geosynchronous satellites have Earth-fixed beams that illuminate the same geographic area all the time. Non-geostationary or geosynchronous satellites (e.g., LEOs and MEOs) may have Earth-moving beams that continuously move and illuminate different geographic areas at different times on a continuous basis. Non-geostationary or Non-geosynchronous satellites may have quasi-Earth-fixed beams that illuminate a given geographic area for some time period and then illuminate a different geographic area for a different time period.

In operation F18S2, (which is similar to operation F16S2 in FIG. 16 or combined operation F17S2 and operation F17S3 in FIG. 17), in an example embodiment of the disclosure, the gNB/eNB sends one or more parameters in System Information to help the UE save some processing power and to enable a robust cell reselection. In an example approach, in operation F18S2, the gNB/eNB sends one or more of these parameters: disable-s-IntraSearchP, neighborSearchTimerCellReselection, and parameters related to combination triggers in support of cell reselection. See the description associated with FIG. 19 for details of combination triggers.

In operation F18S3, the UE determines the need to (i) search for neighbors and (ii) make measurements of neighbor cells. In an example embodiment, the UE processes the typical parameters such as s-IntraSearchP and s-IntraSearchQ in System Information (e.g., SIB2) and the new parameters defined by this disclosure such as disable-s-IntraSearchP and neighborSearchTimerCellReselection and decides whether to look for neighbor cells or not.

In one example implementation, in operation F18S3, if the gNB has specified disable-s-IntraSearchP and neighborSearchTimerCellReselection in System Information, the UE starts or restarts a timer after performing cell reselection. Furthermore, the UE skips the neighbor cell search and avoids making measurements of neighbor cells as along as the timer value is less than neighborSearchTimerCellReselection. In an example approach, when such timer is not running, the UE ignores the value of s-IntraSearchP based on the parameter disable-s-IntraSearchP and searches for neighboring cells. The UE can subsequently detect an incoming NTN cell and perform cell reselection when suitable conditions are met.

In operation F18S4, when the UE is searching for neighbor cells and making measurements of neighbor cells, the UE evaluates one or more trigger conditions and performs cell reselection when one or more of the trigger conditions is met.

Figure 19:
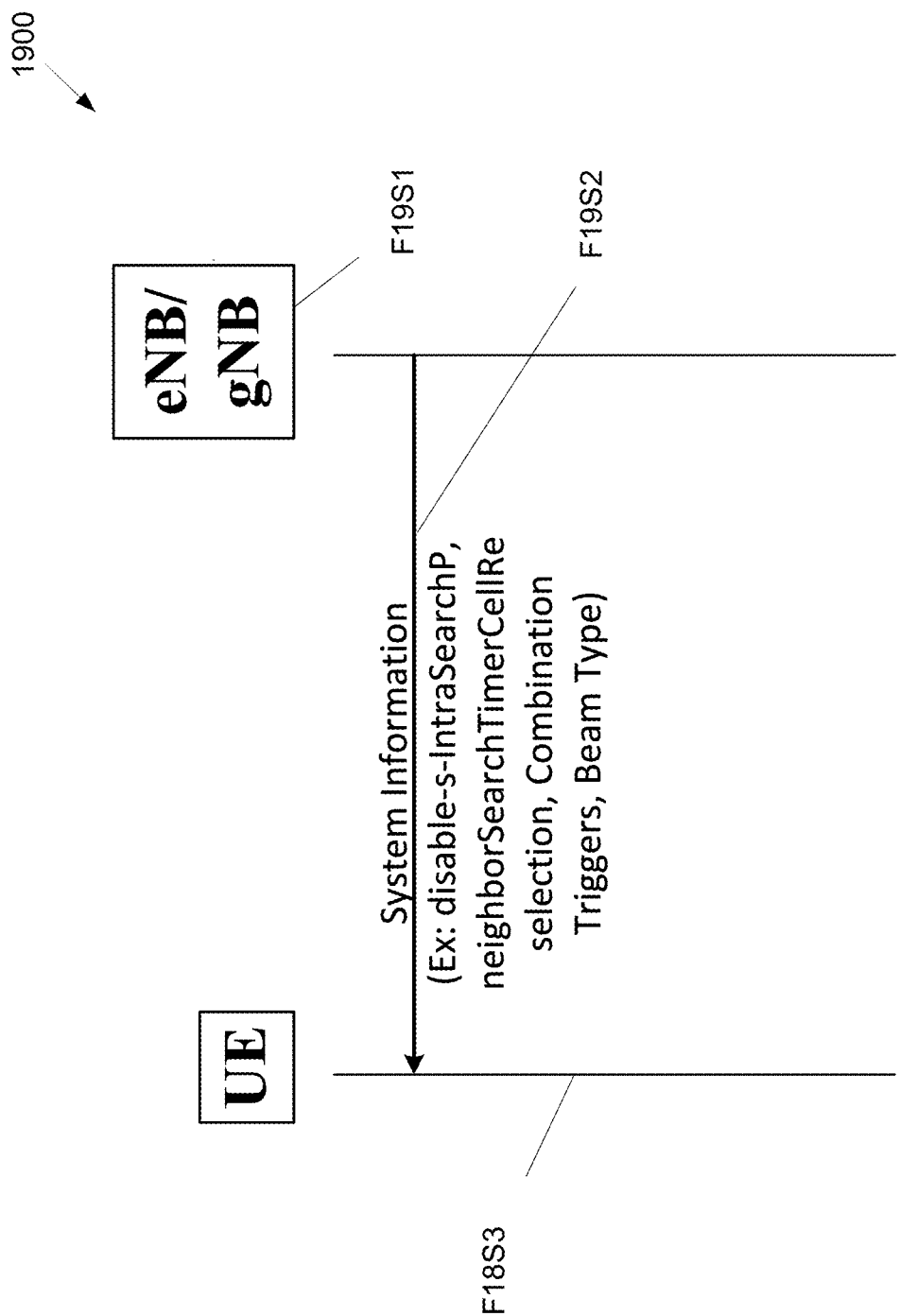
FIG. 19 illustrates an example network procedure for a flexible cell reselection framework in an NTN according to embodiments of the present disclosure.

FIG. 19 illustrates an example network procedure for a flexible cell reselection framework in an NTN 1900 according to embodiments of the present disclosure. The embodiment of the network procedure for a flexible cell reselection framework in an NTN 1900 illustrated in FIG. 19 is for illustration only. FIG. 19 does not limit the scope of this disclosure to any particular implementation of the network procedure for a flexible cell reselection framework in an NTN 1900.

In operation F19S1, in an example embodiment of the disclosure, the gNB/eNB makes a decision about specific trigger combinations. The gNB/eNB also determines which conditions should be used by UEs to evaluate the need for cell reselection. A given condition utilizes a specific combination of triggers.

In operation F19S2, in an example embodiment of the disclosure, the gNB specifies one or more of the following in System Information: (i) the number of Trigger Conditions N (e.g., N=2), (ii) identification of the Combination Triggers for each of the Trigger Conditions (e.g., the Combination Trigger that combines the Individual Triggers of Time Since Last Cell Reselection (TSLCR) and Neighbor Cell Signal Measurement (NCSM)) and the method of combining Individual Triggers of a Combination Trigger (e.g., a logical function such as a logical AND function or a logical OR function), and (iii) Neighbor Cell Selection Method (e.g., Rank based or Non-Rank-Based). Details of trigger combinations and triggering conditions are given below after the description of operation F19S3.

In an example approach, the gNB/eNB can define two Trigger Conditions (i.e., N=2) for Quasi-Earth-fixed beams-Trigger Condition 1 and Trigger Condition 2. To define Trigger Condition 1, the gNB specifies TSLCR and NCSM as Individual Triggers and specifies the logical "AND" function to combine TSLCR and NCSM. To define Trigger Condition 2, the gNB specifies the Neighor-Serving Cell Signal Measurement (NSCSM) as the Individual Triggers as well as the Trigger Combination (and hence no logical combining function is needed in this example). The example approach described here can be extended to any suitable number of Trigger Conditions and any suitable number of Individual Triggers for a given Trigger Combination. Furthermore, for the neighbor cell based Individual Triggers (which are part of a Combination Trigger), the satellite movement based offset can be applied per gNB/eNB decision.

In another example approach, the set of all conditions (with associated combinations of triggers) is fully defined in the specifications and the gNB/eNB indicates in System Information which of those conditions (e.g., condition 1 and 3 out of the set of 5 conditions) should be used by the UE while carrying out cell reselection.

In yet another example approach, the set of all trigger conditions (with associated combinations of triggers) is fully defined in the specifications, and the applicability of a given trigger condition is defined in the specification (e.g., conditions 1 and 3 applicable to Earth-fixed beams). In such case, in an example approach, the gNB/eNB indicates "Beam Type" in System Information. The UE then utilizes the applicable conditions based on Beam Type.

In another approach, the trigger conditions applicable to GNSS-capable UEs and non-GNSS-capable UEs are identified so that a UE can evaluate relevant trigger conditions based on its GNSS capability. Such applicability of the GNSS capability of a UE for one or more relevant trigger conditions may be explicitly specified in specifications or identified by the gNB/eNB in System Information via a suitable indicator or flag for a given trigger condition.

In operation F19S3, the UE makes measurements of quantities specified as triggers and evaluates the applicable conditions that use one or more combination triggers. The UE performs cell reselection when any of the conditions is met.

Individual Triggers and Trigger Combinations

Different trigger quantities are suitable for different types of beams. Individual triggers and trigger combinations relevant for cell reselection in an NTN are specified below.

One-way Propagation Delay with the Serving Cell (OPDSC) as a Trigger. The one-way propagation delay (OPD) between the NTN platform (e.g., a satellite or HAPS) and the UE can be used as an indirect indicator of the distance between the NTN platform and the UE. When the OPD is large for the serving cell (e.g., for a fixed-Earth beam case), the UE is near the edge of the serving cell. A large OPD points to the need for cell reselection (e.g., for a fixed-Earth beam case). For example, "if (OPDSC>Threshold_PropagationDelayServingCell_CellReselection)" can be used as part of a combination trigger in a trigger condition. The UE can estimate the gNB-to-UE-delay by observing the time difference between (i) the instant when a SIB containing the timestamp is received at the UE and (ii) the instant when a SIB containing the timestamp is created by the gNB. The UE can then calculate the OPDSC by subtracting the gNB-to-the-platform delay (e.g., the total feeder link delay) from the gNB-to-UE-delay. The OPDSC can serve as a useful trigger for an Earth-fixed beam and an Earth-moving beam. The gNB/eNB broadcasts Threshold_PropagationDelayServingCell_CellReselection in System Information in an example embodiment of the disclosure.

As a trigger, the distance between the UE and a given cell (i.e., the serving cell or a neighbor cell) can be defined as the distance between the UE and the cell center, where such cell center is a Reference Point in the center of the beam's coverage area of the serving cell and the neighbor cell.

Distance-To-Platform in the Serving Cell (DTPSC) as a Trigger. The distance between the NTN platform in the serving cell and the UE can be used as a trigger. When DTPSC is large, the UE is near the edge of the serving cell. A large distance points to the need for cell reselection (e.g., for a fixed-Earth beam case). For example, "if (DTPSC>Threshold_Distance_ServingCell_CellReselection)" can be used as part of a combination trigger in a trigger condition. A GNSS-capable UE can estimate the distance to the platform by utilizing its GNSS location and the platform's GNSS location received in System Information. The distance can serve as a useful trigger for an Earth-fixed beam. The gNB/eNB broadcasts Threshold_Distance_ServingCell_CellReselection in System Information in an example embodiment of the disclosure.

Time-Since-Last-Cell Reselection (TSLCR) as a Trigger. The time elapsed since the last cell reselection can be used as a trigger (e.g., for a quasi-Earth-fixed beam). For example, "if (TSLCR>Threshold_Time_CellReselection)" can be used as part of a combination trigger in a trigger condition. The UE starts or restarts the TSLCR timer when it performs cell reselection to a new cell. The gNB/eNB broadcasts Threshold_Time_CellReselection in System Information in an example embodiment of the disclosure.

The TSLCR approach is equivalent to the approach where time is represented by the serving time or the dwell time of the cell in a given geographic area in case of quasi-Earth-fixed beams (i.e., fixed beams for LEOs). The use of an absolute time stamp as a trigger is another equivalent approach to the TSLCR approach.

Serving Cell Elevation Angle (SCEA) as a Trigger. The serving cell's elevation angle can be used a trigger for cell reselection. A large SCEA implies that a UE is near the edge of the serving cell and hence points to the need for cell reselection. For example, "if (SCEA>Threshold_ServingElevationAngle_NTN)" can be used as part of a combination trigger in a trigger condition. In this formulation, the elevation angle is 90° when an NTN cell's satellite is directly above the head and increases as the NTN cell or beam continues to move away from the UE. The gNB/eNB broadcasts Threshold_ServingElevationAngle_NTN in System Information in an example embodiment of the disclosure. The gNB/eNB broadcasts Threshold_ServingElevationAngle_NTN in System Information in an example embodiment of the disclosure.

Neighbor Cell Elevation Angle (NCEA) as a Trigger. The neighbor cell's elevation angle can be used a trigger for cell reselection. A large SCEA implies that a UE is near the edge of the upcoming neighbor cell and hence points to the need for cell reselection. For example, "if (NCEA>Threshold_NeighborElevationAngle_NTN)" can be used as part of a combination trigger in a trigger condition. In this formulation, the elevation angle is 90° when an NTN cell's satellite is directly above the head and increases as the NTN cell or beam continues to move away from the UE. The gNB/eNB broadcasts Threshold_NeighborElevationAngle_NTN in System Information in an example embodiment of the disclosure.

Absolute Signal Measurement Difference (ASMD) as a Trigger. The absolute difference in signal measurements between the serving cell and a neighbor cell can be used a trigger for cell reselection. A small ASMD implies that a UE is near the boundary of the upcoming neighbor cell and the serving cell and hence points to the need for cell reselection. For example, "if (ASMD<Threshold_AbsoluteDifference_ServingNeighbor_NTN) for timeToTrigger" can be used as part of a combination trigger in a trigger condition. timeToTrigger can be set to zero. Example signal measurements include RSRP, RSRQ, and SINR. The gNB/eNB broadcasts Threshold_AbsoluteDifference_ServingNeighbor_NTN in System Information in an example embodiment of the disclosure.

Neighbor Cell Signal Measurement (NCSM) as a Trigger. The neighbor cell signal measurement can be used a trigger for cell reselection. A strong NCSM implies that a UE has a satisfactory radio environment with the neighbor cell. For example, "if (NCSM>Threshold_SignalMesurement_Neighbor_NTN) for timeToTrigger" can be used as part of a combination trigger in a trigger condition. timeToTrigger can be set to zero. Example signal measurements include RSRP, RSRQ, and SINR. The gNB/eNB broadcasts Threshold_SignalMesurement_Neighbor_NTN in System Information in an example embodiment of the disclosure.

Neighbor and Serving Cell Signal Measurement (NSCSM) as a Trigger. Both the neighbor cell signal measurement (NCSM) and the serving cell signal measurement (SCSM) can be used as part of a trigger for cell reselection. The combination of a strong NSM and a weak SCM implies that a UE has better radio channel environment with a neighbor cell than the serving cell and hence cell reselection is desirable. For example, "if ((NCSM-SCSM)>Threshold_SignalMesurement_Serving_Neighbor_NTN) for time ToTrigger" can be used as part of a combination trigger in a trigger condition. timeToTrigger can be set to zero. Example signal measurements include RSRP, RSRQ, and SINR. The gNB/eNB broadcasts Threshold_SignalMesurement_Serving_Neighbor_NTN in System Information in an example embodiment of the disclosure.

Enhancement of Individual Neighbor Cell Triggers

In an example embodiment of the disclosure, the satellite movement based offsets can be added in the non-signal measurement neighbor cell trigger quantity (e.g., elevation angle, distance, and propagation delay) based conditions mentioned above to encourage or discourage cell reselection to a given neighbor cell. For example, a positive offset can be used to encourage cell reselection to a given neighbor cell for an incoming neighbor cell. A zero offset would neither encourage nor discourage cell reselection to a neighbor cell. A negative offset can be used to discourage cell reselection to a given neighbor cell for an outgoing neighbor cell.

Depending upon the position of the offset in the equation that defines the trigger condition, the offsets can be reversed; for example, a positive offset can be used to discourage cell reselection to a neighbor cell instead of encouraging cell reselection.

In another possible implementation, to discourage cell reselection to a neighbor cell not specified in the neighbor list, the UE can be prohibited from evaluating neighbor cells that are not in the neighbor list for the purpose of cell reselection and handover. In an example approach, the UE can still search for and make measurements of neighbor cells not listed in the neighbor list to support Self Organizing Network (SON) Functions and Minimization of Drive Tests (MDT).

In an example approach, the basic trigger "if (triggerQuantityForANeighbor>Threshold_TriggerQuantity)" can be modified to "if ((triggerQuantityForANeighbor+Δ)>Threshold_TriggerQuantity)" to reflect the satellite movement based offset Δ. In an example approach, in a given cell, the gNB/eNB broadcasts Δ values for the target neighbor cells.

As a specific example, the basic trigger "if (NCEA>Threshold_NeighborElevationAngle_NTN)" can be modified to "if ((NCEA+Δ)>Threshold_NeighborElevationAngle_NTN)" as part of a combination trigger in a trigger condition to reflect the satellite movement based offset Δ.

In an example implementation, in case the UE carries out a search for neighbor cells not mentioned in System Information, a default offset (e.g., a negative offset) can be defined and broadcast by the gNB/eNB in an example approach to discourage cell reselection to such neighbor cells. In another implementation approach, a default value may be explicitly defined in specifications.

Combination Triggers and Trigger Conditions

In a Terrestrial Network (TN), RSRP and RSRQ based cell reselection is commonly used. However, in an NTN, signal measurements such as RSRPs may be similar for the serving cell and neighboring cells. Hence, for enhanced reliability of the cell reselection procedure, multiple triggers including triggers specific to NTNs can be combined.

In an embodiment of the disclosure, individual quantity-based partial triggers (i.e., Individual Triggers) defined earlier are combined in a flexible manner to create a multi-quantity combination trigger for a given trigger condition.

In an embodiment of the disclosure, to create a combination trigger ("Trigger A"), the Individual Triggers of the "OPDSC Trigger" and the "NCSM Trigger" are combined using a logical AND function as follows.

["If (OPDSC>Threshold_PropagationDelayServingCell_CellReselection)" ] AND
["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "A' is suitable for Earth-Moving Beams. The use of the satellite movement based Neighbor List prevents an incorrect cell reselection (i.e., cell reselection to a neighbor cell that is moving away from the UE).

The first part of the combination trigger "A" indicates that the UE is away from the center of the serving cell and near the edge of the serving cell, pointing to the need for cell reselection. The second part of the combination trigger indicates that the neighbor cell can provide to the UE a radio environment suitable for communications.

In an embodiment of the disclosure, to create a combination trigger ("Trigger B"), the Individual Triggers of the "DTPSC Trigger" and the "NCSM Trigger" are combined using a logical AND function as follows.

["if (DTPSC>Threshold_Distance_ServingCell_CellReselection)" ] AND

["If ((NSM+4)>Threshold_SignalMesurement_Neighbor_NTN) for timeToTrigger" ] for any of the neighbor cells, the cell reselection is triggered, and, the Neighbor Cell Selection procedure is executed.

This combination trigger "B' is suitable for Earth-Moving Beams. The use of the satellite movement based Neighbor List prevents an incorrect cell reselection (i.e., cell reselection to a neighbor cell that is moving away from the UE).

The first part of the combination trigger "B" indicates that the UE is away from the center of the serving cell and near the edge of the serving cell, pointing to the need for cell reselection. The second part of the combination trigger indicates that the neighbor cell can provide to the UE a radio environment suitable for communications.

The Combination Trigger "B" is more direct than the Combination Trigger "A" in that it utilizes the distance itself instead of the propagation delay, which is a proxy for the distance.

In an embodiment of the disclosure, to create a combination trigger ("Trigger C"), the Individual Triggers of the "TSCR Trigger" and the "NCSM Trigger" are combined using a logical AND function as follows.

["if (TSLCR>Threshold_Time_CellReselection)" ] AND

["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "C' is suitable for Quasi-Earth-Fixed Beams and Earth-Moving Beams. The use of the satellite movement based Neighbor List prevents an incorrect cell reselection (i.e., cell reselection to a neighbor cell that is moving away from the UE).

The first part of the combination trigger "C" indicates that a sufficient time has elapsed since the last time a cell reselection was performed and that a neighbor cell suitable for cell reselection should be arriving soon. The second part of the combination trigger indicates that the neighbor cell can provide to the UE a radio environment suitable for communications.

The Combination Trigger "C" is useful even for the UEs that are not GNSS-capable.

In an embodiment of the disclosure, to create a combination trigger ("Trigger D"), the Individual Triggers of the "SCEA Trigger" and the "NCSM Trigger" are combined using a logical AND function as follows.

["if (SCEA>Threshold_ServingElevationAngle_NTN)" ] AND

["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "D' is suitable for Quasi-Earth-Fixed Beams and Earth-Moving Beams. The use of the satellite movement based Neighbor List prevents an incorrect cell reselection (i.e., cell reselection to a neighbor cell that is moving away from the UE).

The first part of the combination trigger "D" indicates that the UE is away from the center of the serving cell and near the edge of the serving cell, pointing to the need for cell reselection. The second part of the combination trigger indicates that the neighbor cell can provide to the UE a radio environment suitable for communications.

In an embodiment of the disclosure, to create a combination trigger ("Trigger E"), the Individual Triggers of the "NCEA Trigger" and the "NCSM Trigger" are combined using a logical AND function as follows.

["if (NCEA>Threshold_NeighborElevationAngle_NTN)" ] AND

["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "E' is suitable for Quasi-Earth-Fixed Beams and Earth-Moving Beams. The use of the satellite movement based Neighbor List prevents an incorrect cell reselection (i.e., cell reselection to a neighbor cell that is moving away from the UE).

The first part of the combination trigger "E" indicates that the UE is close to the incoming neighbor cell, pointing to the need for cell reselection. The second part of the combination trigger indicates that the neighbor cell can indeed provide to the UE a radio environment suitable for communications.

In an embodiment of the disclosure, to create a combination trigger ("Trigger F"), the Individual Triggers of the "SCEA Trigger," "NCEA Trigger," and the "NCSM Trigger" are combined using a logical AND function as follows.

["if (SCEA>Threshold_ServingElevationAngle_NTN)" ] AND

["if (NCEA>Threshold_NeighborElevationAngle_NTN)" ] AND

["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "F' is suitable for Quasi-Earth-Fixed Beams and Earth-Moving Beams. The use of the satellite movement based Neighbor List prevents an incorrect cell reselection (i.e., cell reselection to a neighbor cell that is moving away from the UE).

The first part of the combination trigger "F" indicates that the UE is away from the serving cell, the second part of the combination trigger "F" indicates that the UE is close to the incoming neighbor cell, pointing to the need for cell reselection. The third part of the combination trigger "F" indicates that the neighbor cell can indeed provide to the UE a radio environment suitable for communications.

In an embodiment of the disclosure, to create a combination trigger ("Trigger G"), the "ASMD Trigger" is used as a standalone Individual Trigger without combining with any other Individual Trigger as a special case.

["if (ASMD<Threshold AbsoluteDifference_Serving-Neighbor_NTN) for timeToTrigger"] for any of the neighbor cells, the cell reselection is triggered, and, the Neighbor Cell Selection procedure is executed. To prevent frequency cell reselections resulting from a UE meeting the same Trigger Condition "G" within a short time period, a timer such as "TriggerGTimer" is started after cell reselection. While this timer "TriggerGTimer" is running, the Trigger Condition "G" is not evaluated for the purpose of cell reselection. Note that other Trigger Conditions (i.e., non-Trigger G Conditions) are still evaluated by the UE.

This combination trigger "G" is suitable for Earth-Fixed Beams, Quasi-Earth-Fixed Beams and Earth-Moving Beams. The use of the satellite movement based Neighbor List prevents an incorrect cell reselection (i.e., cell reselection to a neighbor cell that is moving away from the UE).

This trigger can accelerate the cell reselection compared to the traditional cell reselection trigger by allowing cell reselection to a neighbor cell to be weaker than or stronger than the serving cell.

In an embodiment of the disclosure, to create a combination trigger ("Trigger H"), the "NSCSM Trigger" is used as a standalone Individual Trigger without combining with any other Individual Trigger as a special case.

["if ((NCSM-SCSM)>Threshold_SignalMesurement_Serving_Neighbor_NTN) for timeToTrigger"] for any of the neighbor cells, the cell reselection is triggered, and, the Neighbor Cell Selection procedure is executed.

This combination trigger "H" is suitable for Earth-Fixed Beams, Quasi-Earth-Fixed Beams and Earth-Moving Beams. The use of the satellite movement based Neighbor List prevents an incorrect cell reselection (i.e., cell reselection to a neighbor cell that is moving away from the UE).

This trigger is intended as a trigger to rectify a cell reselection error. For example, if an Individual Trigger or a Combination Trigger results in the cell reselection to an incorrect neighbor cell (which becomes the serving cell) but such neighbor cell is significantly better than the serving cell, the cell reselection to such better candidate cell can be performed.

In an embodiment of the disclosure, multiple Trigger Conditions are specified by the gNB/eNB in System Information. A Trigger Condition is associated with one of the combination triggers, and, a combination trigger generally combines two or more individual triggers. As a special case, a combination trigger may have only one individual trigger.

In an example embodiment of the disclosure, the cell reselection is triggered when one or more of the trigger conditions is satisfied for any neighbor cell. This implies the use of OR logical function for combining different trigger conditions. In another embodiment of the disclosure, an AND logical function can be used to combine multiple triggering conditions to make a cell reselection decision.

In one example approach, the neighbor cells evaluated for a triggering condition are explicitly specified in System Information. In another example approach, the neighbor cell evaluated for a triggering condition by the UE is autonomously detected by the UE and is not explicitly specified in System Information.

In an example embodiment of the approach, the propagation delay difference between the serving cell and a neighbor cell is combined with one or more other triggers such as neighbor cell RSRP and time/timer to create a more reliable combination trigger for cell reselection.

"Neighbor Cell Selection" Method

In an example approach, when multiple neighbor cells meet the cell reselection trigger condition, a neighbor cell with the highest rank among these neighbor cells is selected (see below for details).

In an example embodiment of the disclosure, the cell-ranking criterion Rs for serving cell and Rn for neighboring cells are calculated by considering the satellite movement based offsets:

$R_s = Q_{meas,s} + Q_{hyst} - \text{Qoffset}_{temp}$ $R_n = Q_{meas,n} - \text{Qoffset} - \text{Qoffset}_{temp} + \Delta$ In an example embodiment, after a cell reselection is triggered, the cell reselection is performed to the neighbor with the highest rank Rn without considering Rs and by setting $\Delta$ to zero.

In another example embodiment, after a cell reselection is triggered, $\Delta$ is set to zero, and the reselection is performed to the neighbor cell with the highest rank Rn if (Rn>Rs) or (Rn>=Rs).

In another example embodiment, after a cell reselection is triggered, the reselection is performed to the neighbor cell with the highest rank Rn if (Rn>Rs) or (Rn>=Rs) when configured $\Delta$ values are used for different neighbor cells.

In another example embodiment of the disclosure, the cell-ranking criterion Rn for a neighbor cell is calculated by considering the satellite movement based offset and the number of trigger conditions satisfied by a neighbor cell (referred to as numTriggerConditions here), where a is the incentive for meeting a trigger condition that is specified by the gNB/eNB in System Information:

$R_n = Q_{meas,n} - \text{Qoffset} - \text{Qoffset}_{temp} + \Delta + (num\ TriggerConditions * \alpha)$ In such case, the cell reselection is performed to the neighbor with the highest rank Rn without considering Rs after a trigger condition is satisfied.

In another approach, each trigger condition can have its own weight a.

Signaling of the Satellite Movement-Based Parameters

In an embodiment of the disclosure, the satellite movement-based offset is specified per neighbor cell in operation F16S2, F17S2, F18S2, and/or F19S2.

In another embodiment of the disclosure, the satellite movement-based offset is specified per set of neighbor cells to reduce the overhead in operation F7S2, F8S2, F9S2, and/or F10S2.

In yet another embodiment of the disclosure, the type of the neighbor cell is indicated based on the movement of the neighbor cell using one or more of the following designations for quasi-Earth-fixed beams: "Incoming Neighbor," and "Current Geographic Neighbor," and "Incoming Overlapping Neighbor." The designation "Incoming Neighbor" means that the neighbor cell is the geographic neighbor cell of a cell that would provide almost identical overlapping coverage to the currently serving cell. The designation "Current Geographic Neighbor" means that this neighbor cell is the geographic neighbor of the current serving cell. The designation "Incoming Overlapping Neighbor" means that the neighbor cell is the cell that would provide almost identical overlapping coverage to the currently serving cell.

Such neighbor cell designations can be used by the UE to prioritize the selection of a given type of neighbor for quasi-Earth-fixed beams.

In an example approach, neighbor designation-specific coefficients are used with a given threshold B to realize the prioritization as shown in equation Below.

$R_n = Q_{meas,n} - \text{Qoffset} - \text{Qoffset}_{temp} + C * \beta$

The parameter $\beta$ can be used to avoid ping-pong during the cell reselection and the coefficient c is used to set different priories for different types of cells. For example, c can be set to (i) "3" if the neighbor cell "n" is "Incoming Overlapping Neighbor," (ii) "2" if the neighbor cell "n" is "Incoming Neighbor," and (iii) "1" if the neighbor cell "n" is "Current Geographic Neighbor." A larger positive value of c prioritizes the selection of a neighbor cell and a smaller positive value of c deprioritizes the selection of a neighbor cell.

The parameter B and the coefficients c can be specified by the gNB in operation F16S2, F17S2, F18S2, and/or F19S2.

In another embodiment of the disclosure, the type of the neighbor cell is indicated based on the movement of the neighbor cell using one or more of the following designations for Earth-moving beams: "Incoming Neighbor," "Neutral Neighbor," and "Outgoing Neighbor." The designation "Incoming Neighbor" means that the neighbor cell's beam is moving toward the geographic area currently served by the serving cell and the design intent is to encourage the cell reselection to such neighbor cell. The designation "Neutral Neighbor" means that cell reselection to this neighbor cell is neither encourage nor discouraged from the perspective of beam movement. The designation "Outgoing Neighbor" means that the neighbor cell's beam is moving away from the geographic area currently served by the serving cell and the design intent is to discourage the cell reselection to such neighbor cell.

Such neighbor cell designations can be used by the UE to prioritize the selection of a given type of neighbor for quasi-Earth-fixed beams.

In an example approach, neighbor designation-specific coefficients are used with a given threshold y to realize the prioritization as shown in equation Below.

$$R_n = Q_{meas,n} - Qoffset - Qoffset_{temp+d+y}$$

The parameter y can be used to avoid ping-pong during the cell reselection and the coefficient d is used to set different priories for different types of cells. For example, d can be set to (i) "1" if the neighbor cell "n" is "Incoming Neighbor," (ii) "0" if the neighbor cell "n" is "Neutral Neighbor," and (iii) "−1" if the neighbor cell "n" is "Outgoing Neighbor." A positive (or large positive) value of d prioritizes the selection of a neighbor cell and a negative value of d deprioritizes the selection of a neighbor cell.

The parameter y and the coefficients d can be specified by the gNB in operation F16S2, F17S2, F18S2, and/or F19S2.

Additional Standalone/Individual and Combination Triggers

Inner Area (IA) as a Trigger. Since the satellite beam's coverage on the Earth's surface area is elliptical (and not circular), the UE can determine whether it is inside or outside the IA of a given beam or cell. In case of Earth-fixed beams and Earth-moving beams, the UE can use "the UE is outside the Inner Area of the serving cell" (or equivalently, "The UE is outside the Inner Area of the serving beam of the serving cell") criterion as a trigger to perform cell reselection. If the UE is outside the IA, it indicates that that the UE is in the neighbor overlapping area (i.e., border of two or more cells) and there is a likelihood of the UE finding a suitable neighbor cell for cell reselection. The UE can use its position (e.g., lat and long) along with the center, the major axis (or semi-major axis), and the minor axis (oe semi-minor axis) of the elliptical area to determine whether it is inside or outside the IA.

For example, the UE utilizes the cell center (i.e., the Reference Point expressed as (cx,cy)), the major axis of the IA (majorAxis=2a, with a=semi-major axis), and minor axis of the IA (minorAxis=2b, with b=semi-major axis) and its GNSS-based position (ueX, ueY) to determine if it is inside the IA nor not.

The UE determines whether it is inside (or on) the IA or nor in an implementation-specific manner. Here is one possible approach. The UE calculates the following quantity: comparison Value=$(ueX-cx)^2/a^2+(ueY-cy)^2/b^2$. If comparison Value<=1, the UE is inside or on the IA. Otherwise, the UE is outside the IA.

In an embodiment of the disclosure, the gNB broadcasts the center, the major axis (or semi-major axis), and the minor axis (oe semi-minor axis) of the elliptical area of its beam in operation F16S2, F17S2, F18S2, and/or F19S2. In an example approach, the standalone Inner Area trigger is combined with one or more of the standalone triggers specified earlier to create a combination trigger for cell reselection.

In an embodiment of the disclosure, to create a combination trigger ("Trigger I"), the Individual Triggers of the "Inner Area Trigger" and the "NCSM Trigger" are combined using a logical AND function as follows.

["If the UE is outside the Inner Area of the serving beam of the serving cell")] AND

["If (NCSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "I" is suitable for Earth-fixed Beams, quasi-Earth-fixed beams, and Earth-Moving Beams.

The first part of the combination trigger "I" indicates that the UE is away from the center of the serving cell and near the edge of the serving cell, pointing to the need for cell reselection. The second part of the combination trigger indicates that the neighbor cell can provide to the UE a radio environment suitable for communications.

In an embodiment of the disclosure, to create a combination trigger ("Trigger J"), the Individual Triggers of the "Inner Area Trigger," "Serving Cell RSRP/RSRQ Trigger," and the "NCSM Trigger" are combined using a logical AND function as follows.

["If the UE is outside the Inner Area of the serving beam of the serving cell")] AND

["If the Serving Cell RSRP/RSRQ<RSRP/RSRQ_Threshold"] AND

["If ((NSM+4)>Threshold_SignalMesurement_Neighbor_NTN) for timeToTrigger" ] for any of the neighbor cells, the cell reselection is triggered, and, the Neighbor Cell Selection procedure is executed.

This combination trigger "J" is suitable for Earth-fixed Beams, quasi-Earth-fixed beams, and Earth-Moving Beams.

The first two parts of the combination trigger "J" indicates that the UE is away from the center of the serving cell and near the edge of the serving cell, pointing to the need for cell reselection. The last or third part of the combination trigger indicates that the neighbor cell can provide to the UE a radio environment suitable for communications.

In an embodiment of the disclosure, to create a combination trigger ("Trigger K"), the Individual Triggers of the "Serving Cell RSRP/RSRQ Trigger," and the "NCSM Trigger" are combined using a logical AND function as follows.

["If the Serving Cell RSRP/RSRQ<RSRP/RSRQ_Threshold"] AND

["If ((NSM+Δ)>Threshold_SignalMesurement_Neighbor_NTN) for timeToTrigger" ] for any of the neighbor cells, the cell reselection is triggered, and, the Neighbor Cell Selection procedure is executed.

This combination trigger "K' is suitable for Earth-fixed Beams, quasi-Earth-fixed beams, and Earth-Moving Beams.

The first parts of the combination trigger "K" indicates that the UE is away from the center of the serving cell and near the edge of the serving cell, pointing to the need for cell reselection. The second part of the combination trigger indicates that the neighbor cell can provide to the UE a radio environment suitable for communications.

Serving Cell Center-UE Distance (SCCUD) as a Trigger. The UE can calculate the distance between the serving cell's center and itself to determine how close or far away it is from the center of the service cell (or equivalently the center of the beam of the serving cell). If the UE is far away from the serving cell's center, it indicates that that the UE is in the neighbor overlapping area (i.e., border of two or more cells)

and there is a likelihood of the UE finding a suitable neighbor cell for cell reselection.

In an embodiment of the disclosure, the gNB broadcasts the center of the serving cell and the servingCellDistance-Threshold in operation F16S2, F17S2, F18S2, and/or F19S2. In an example approach, the standalone SCCUD trigger is combined with one or more of the standalone triggers specified earlier to create a combination trigger for cell reselection.

In an embodiment of the disclosure, to create a combination trigger ("Trigger L"), the Individual Triggers of the "SCCUD Trigger" and the "NCSM Trigger" are combined using a logical AND function as follows.

["If "UE-Serving Cell Center Distance>servingCellDistanceThreshold")] AND

["If (NCSM+Δ)>Threshold_SignalMesurement_Neighbor_NTN) for timeToTrigger"] for any of the neighbor cells, the cell reselection is triggered, and, the Neighbor Cell Selection procedure is executed.

This combination trigger "L' is suitable for Earth-fixed Beams, quasi-Earth-fixed beams, and Earth-Moving Beams.

The first part of the combination trigger "L" indicates that the UE is away from the center of the serving cell and near the edge of the serving cell, pointing to the need for cell reselection. The second part of the combination trigger indicates that the neighbor cell can provide to the UE a radio environment suitable for communications.

In an embodiment of the disclosure, to create a combination trigger ("Trigger M"), the Individual Triggers of the "RSRP/RSRQ Trigger," "SCCUD Trigger" and the "NCSM Trigger" are combined using a logical AND function as follows.

["If the Serving Cell RSRP/RSRQ<RSRP/RSRQ_Threshold")] AND

["If UE-Serving Cell Center Distance>servingCellDistanceThreshold")] AND

["If ((NCSM+4)>Threshold_SignalMesurement_Neighbor_NTN) for timeToTrigger"] for any of the neighbor cells, the cell reselection is triggered, and, the Neighbor Cell Selection procedure is executed.

This combination trigger "M' is suitable for Earth-fixed Beams, quasi-Earth-fixed beams, and Earth-Moving Beams.

The first two parts of the combination trigger "M" indicates that the UE is away from the center of the serving cell and near the edge of the serving cell, pointing to the need for cell reselection. The third or last part of the combination trigger indicates that the neighbor cell can provide to the UE a radio environment suitable for communications.

Remaining Serving Time (RST) as a Trigger. The UE can calculate the remaining serving time of the current serving cell (remainingServingTime) by subtracting the current time from the endServingTime and compare it with a threshold remainingServingTimeThreshold. If less time is remaining, the UE would trigger cell reselection.

In an embodiment of the disclosure, the gNB broadcasts endServingTime and remainingServingTime Threshold in operation F16S2, F17S2, F18S2, and/or F19S2. In an example approach, the standalone RST trigger is combined with one or more of the standalone triggers specified earlier to create a combination trigger for cell reselection. This can be used for quasi-earth-fixed beams and feeder link switch.

In an embodiment of the disclosure, to create a combination trigger ("Trigger N"), the Individual Triggers of the "RST Trigger" and the "NCSM Trigger" are combined using a logical AND function as follows.

["If remainingServingTime<remainingServingTimeThreshold")] AND

["If (NCSM+Δ)>Threshold_SignalMesurement_Neighbor_NTN) for timeToTrigger"] for any of the neighbor cells, the cell reselection is triggered, and, the Neighbor Cell Selection procedure is executed.

This combination trigger "N' is suitable for quasi-Earth-fixed beams and Earth-moving beams and feeder link switch for quasi-Earth-fixed beams and Earth-Moving Beams.

The first part of the combination trigger "N" points to the need for cell reselection. The second part of the combination trigger indicates that the neighbor cell can provide to the UE a radio environment suitable for communications.

In an embodiment of the disclosure, to perform fallback cell reselection ("Trigger O"), the following condition is evaluated by the UE.

[If "remainingServingTime<fallbackThreshold")], the cell reselection is triggered, and, the UE performs cell reselection to the fallback neighbor cell.

This combination trigger "O" is suitable for quasi-Earth-fixed beams and feeder link switch for quasi-Earth-fixed beams and Earth-Moving Beams.

In an embodiment of the disclosure, the gNB broadcasts fallbackThreshold and identity of the fallback neighbor cell in operation F16S2, F17S2, F18S2, and/or F19S2.

In another embodiment, fallbackThreshold is specified as endServingTime-timeMargin and timeMargin is broadcast in System Information instead of fallbackThreshold.

In an embodiment of the disclosure, the UE performs cell reselection to the fallback neighbor cell when the cell reselection is not triggered by any condition(s) other than trigger "O." In another approach, the UE performs cell reselection to the fallback neighbor cell when no neighbor cell has a better rank than the currently serving cell. The cell reselection to the fallback neighbor cell is carried out when the condition for the trigger "O" is satisfied.

In an embodiment of the disclosure, to perform fallback cell reselection ("Trigger P"), the following condition is evaluated by the UE.

[If "dwellTime>maxServingTimeThreshold")], the cell reselection is triggered, and, the UE performs cell reselection to the fallback neighbor cell. The variable dwellTime is the time elapsed since cell selection or reselection to the current serving cell and maxServingTimeThreshold specifies the maximum period for which an Earth-moving beam covers a given point on the Earth's surface area.

This combination trigger "P" is suitable for Earth-Moving Beams.

In an embodiment of the disclosure, the gNB broadcasts maxServingTimeThreshold and identity of the fallback neighbor cell in operation F16S2, F17S2, F18S2, and/or F19S2.

In an embodiment of the disclosure, the UE performs cell reselection to the fallback neighbor cell when the cell reselection is not triggered by any condition(s) other than trigger "P." In another approach, the UE performs cell reselection to the fallback neighbor cell when no neighbor cell has a better rank than the currently serving cell; the cell reselection to the fallback neighbor cell is carried out when the condition for the trigger "P" is satisfied.

Figure 20:
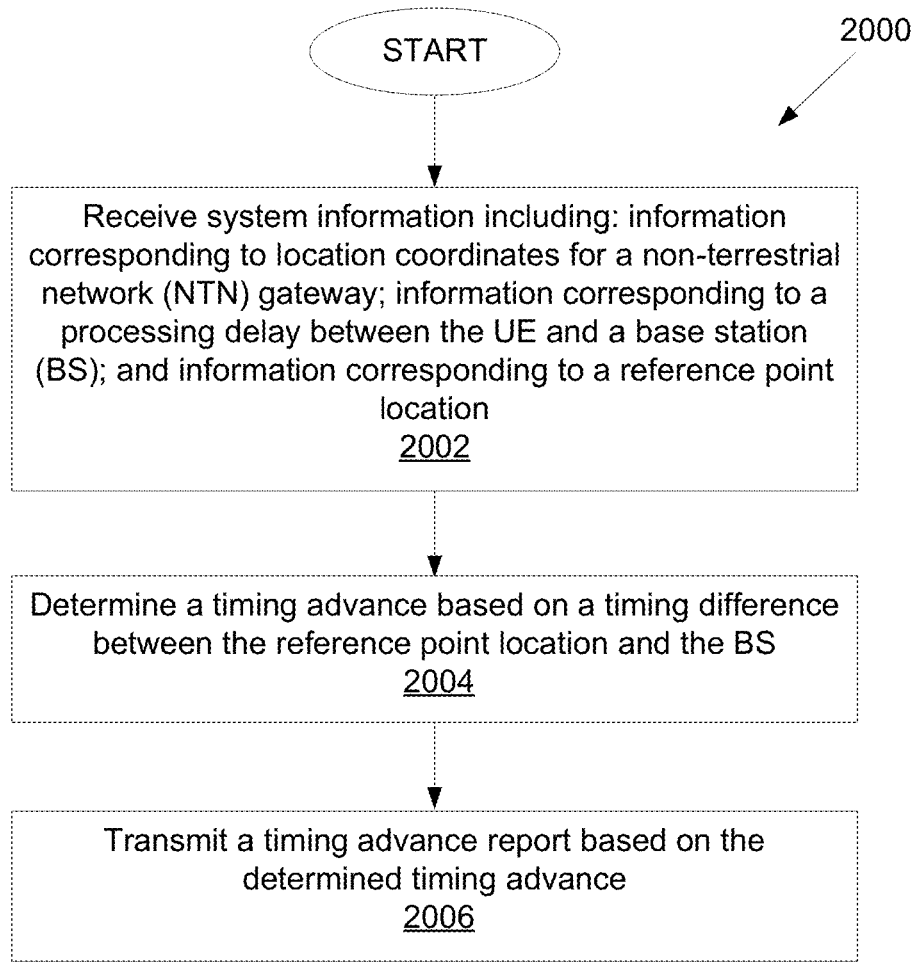
FIG. 20 illustrates a flow chart of a method for operating a UE according to embodiments of the present disclosure.

FIG. 20 illustrates a flow chart of a method 2000 for operating a user equipment (UE), as may be performed by a UE such as UE 116, according to embodiments of the present disclosure. The embodiment of the method 2000 illustrated in FIG. 20 is for illustration only. FIG. 20 does not limit the scope of this disclosure to any particular implementation.

As illustrated in FIG. 20, the method 2000 begins at operation 2002. In operation 2002, the UE (e.g., 111-116 as illustrated in FIG. 1) receives system information including: information corresponding to location coordinates for a non-terrestrial network (NTN) gateway; information corresponding to a processing delay between the UE and a base station (BS); and information corresponding to a reference point location.

In operation 2004, the UE determines a timing advance based on a timing difference between the reference point location and the BS.

In operation 2006, the UE transmits a timing advance report based on the determined timing advance.

In one embodiment, the UE transmits the timing advance report autonomously when a condition is met or when random access is carried out; transmits the timing advance report periodically; or transmits the timing advance report in response to a command from the BS.

In one embodiment, the UE transmits the timing advance report via a radio resource control (RRC) message or via a Medium Access Control (MAC) Control Element (CE).

In one embodiment, the system information includes long-term ephemeris data, wherein a change in the long-term ephemeris data is conveyed via a flag.

In one embodiment, the UE receives position and velocity data comprised in the system information at a first periodicity and a second periodicity, respectively.

In one embodiment, when the system information includes a disable-s-IntraSearchP parameter, the UE searches for a neighbor cell.

In one embodiment, the system information includes neighbor cell selection information, and the UE, based on the neighbor cell selection information, prioritizes incoming cells over outgoing cells.

In one embodiment, the system information further includes elliptical cell information comprising a center, a minor axis or a semi-minor axis, and a major axis or a semi-major axis, of an inner area of a serving cell; the UE determines, based on the elliptical cell information and a location of the UE, whether the UE is within the inner area of the serving cell; and when the UE is outside the inner area of the serving cell and when a signal measurement of a neighbor cell satisfies a threshold value, the UE sends a measurement report or selects the neighbor cell as the serving cell.

Figure 21:
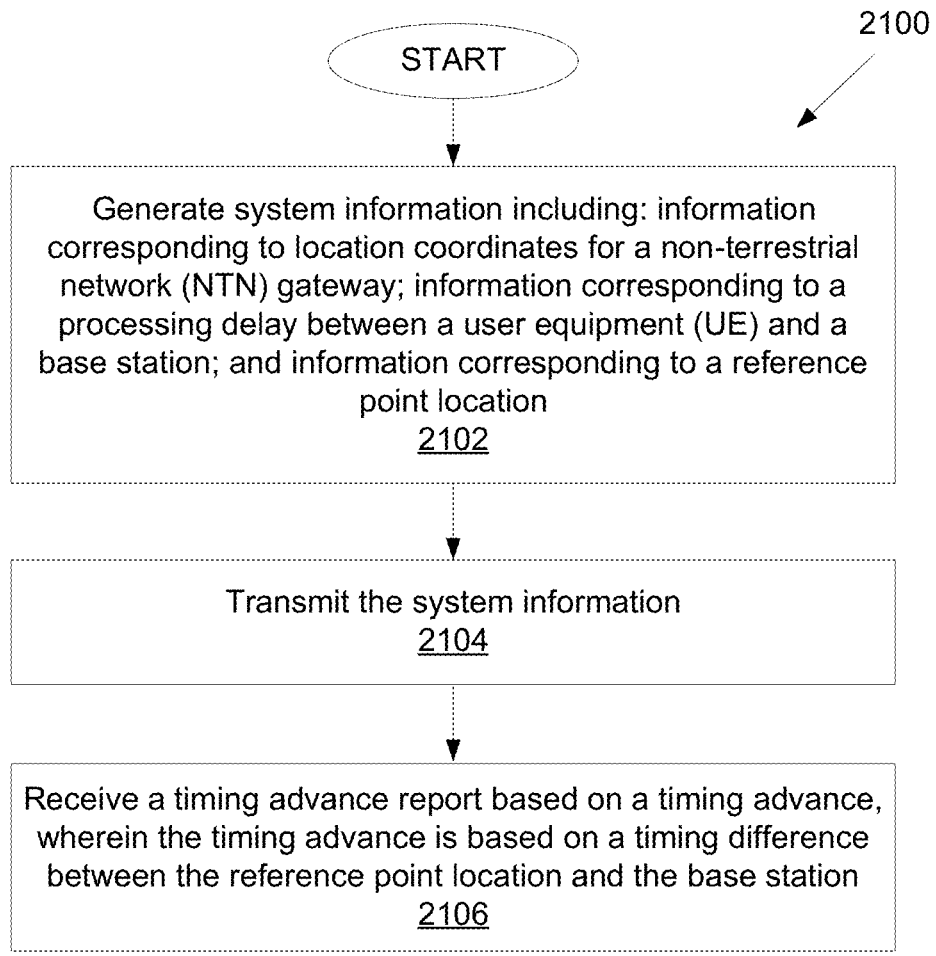
FIG. 21 illustrates a flow chart of another method as may be performed by a BS, according to embodiments of the present disclosure.

FIG. 21 illustrates a flow chart of another method 2100, as may be performed by a base station (BS) such as BS 102, according to embodiments of the present disclosure. The embodiment of the method 2100 illustrated in FIG. 21 is for illustration only. FIG. 21 does not limit the scope of this disclosure to any particular implementation.

As illustrated in FIG. 21, the method 2100 begins at operation 2102. In operation 2102, the BS (e.g., 101-103 as illustrated in FIG. 1) generates system information including: information corresponding to location coordinates for a non-terrestrial network (NTN) gateway; information corresponding to a processing delay between a user equipment (UE) and a base station; and information corresponding to a reference point location.

In operation 2104, The BS transmits the system information.

In operation 2106, the BS receives a timing advance report based on a timing advance, wherein the timing advance is based on a timing difference between the reference point location and the base station.

In one embodiment, the BS receives the timing advance report autonomously when a condition is met or when random access is carried out; receives the timing advance report periodically; or receives the timing advance report in response to a command from the BS.

In one embodiment, the BS receives the timing advance report via a radio resource control (RRC) message or via a Medium Access Control (MAC) Control Element (CE).

In one embodiment, the system information includes long-term ephemeris data, wherein a change in the long-term ephemeris data is conveyed via a flag.

In one embodiment, the BS transmits position and velocity data comprised in the system information at a first periodicity and a second periodicity, respectively.

In one embodiment, a disable-s-IntraSearchP parameter included in the system information is used to search for a neighbor cell.

In one embodiment, the system information includes neighbor cell selection information indicating prioritization of incoming cells over outgoing cells.

In one embodiment, the system information further includes elliptical cell information comprising a center, a minor axis or a semi-minor axis, and a major axis or a semi-major axis, of an inner area of a serving cell; and when an indication is received that a user equipment (UE) is outside the inner area of the serving cell and when a signal measurement of a neighbor cell satisfies a threshold value, a measurement report is received or the neighbor cell is selected as the serving cell.

The above flowcharts illustrate example methods that can be implemented in accordance with the principles of the present disclosure and various changes could be made to the methods illustrated in the flowcharts herein. For example, while shown as a series of operations, various operations in each figure could overlap, occur in parallel, occur in a different order, or occur multiple times. In another example, operations may be omitted or replaced by other operations.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, operation, or function is an essential element that must be included in the claims scope. The scope of patented subject matter is defined by the claims.

What is claimed is:

1. A user equipment (UE), comprising:
    a transceiver configured to receive configuration information for timing advance (TA) reporting; and
    a processor operably coupled to the transceiver, the processor configured to calculate a full TA based on a UE location and assistance information,
    wherein the transceiver is further configured to transmit the TA reporting via a medium access control-control element (MAC CE), and
    wherein the TA reporting is triggered when a difference between the full TA and a previously reported full TA exceeds a threshold.

2. The UE of claim 1, wherein the transceiver is further configured to receive, via a system information block (SIB) or a UE dedicated radio resource control (RRC) message, information indicating a cell reference point, a satellite ephemeris, and a common TA.

3. The UE of claim 1, wherein the threshold is configured based on a system information block (SIB).

4. The UE of claim 1, wherein the threshold is configured based on a UE dedicated radio resource control (RRC) message.

5. The UE of claim 1, wherein:
the full TA is a sum of at least a UE specific TA and a common TA,
the UE specific TA is derived based on a UE location and a satellite ephemeris, and
the common TA is derived based on common TA information.

6. A base station (BS), comprising:
a processor configured to generate configuration information for timing advance (TA) reporting; and
a transceiver operably coupled to the processor, the transceiver configured to:
transmit the configuration information; and
receive, via a medium access control-control element (MAC CE), the TA reporting including a full TA that is based on a user equipment (UE) location and assistance information,
wherein the TA reporting is triggered when a difference between the full TA and a previously reported full TA exceeds a threshold.

7. The BS of claim 6, wherein the transceiver is further configured to transmit, via a system information block (SIB) or a UE dedicated radio resource control (RRC) message, information indicating a cell reference point, a satellite ephemeris, and a common TA.

8. The BS of claim 6, wherein the threshold is configured based on a system information block (SIB).

9. The BS of claim 6, wherein the threshold is configured based on a UE dedicated radio resource control (RRC) message.

10. The BS of claim 6, wherein:
the full TA is a sum of at least a UE specific TA and a common TA,
the UE specific TA is derived based on a UE location and a satellite ephemeris, and
the common TA is derived based on common TA information.

11. A method for operating a user equipment (UE), the method comprising:
receiving configuration information for timing advance (TA) reporting;
calculating a full TA based on a UE location and assistance information; and
transmitting the TA reporting via a medium access control-control element (MAC CE), wherein the TA reporting is triggered when a difference between the full TA and a previously reported full TA exceeds a threshold.

12. The method of claim 11, further comprising receiving, via a system information block (SIB) or a UE dedicated radio resource control (RRC) message, information indicating a cell reference point, a satellite ephemeris, and a common TA.

13. The method of claim 11, further comprising:
identifying the threshold based on a system information block (SIB); or
identifying the threshold based on a UE dedicated radio resource control (RRC) message.

14. The method of claim 11, wherein:
the full TA is a sum of at least a UE specific TA and a common TA,
the UE specific TA is derived based on a UE location and a satellite ephemeris, and
the common TA is derived based on common TA information.

* * * * *